US012621451B2

(12) United States Patent
Kim et al.

(10) Patent No.: US 12,621,451 B2
(45) Date of Patent: *May 5, 2026

(54) METHOD AND APPARATUS FOR ACQUIRING INFORMATION ABOUT SUB-UNITS SPLIT FROM PICTURE

(71) Applicant: SK TELECOM CO., LTD., Seoul (KR)

(72) Inventors: Jae Il Kim, Seoul (KR); Sun Young Lee, Seoul (KR); Se Hoon Son, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/788,919

(22) Filed: Jul. 30, 2024

(65) Prior Publication Data

US 2024/0388709 A1 Nov. 21, 2024

Related U.S. Application Data

(63) Continuation of application No. 17/763,751, filed as application No. PCT/KR2020/012769 on Sep. 22, 2020, now Pat. No. 12,081,753.

(30) Foreign Application Priority Data

Sep. 27, 2019 (KR) ........................ 10-2019-0119353
Sep. 7, 2020 (KR) ........................ 10-2020-0113632

(51) Int. Cl.
*H04N 19/119* (2014.01)
*H04N 19/169* (2014.01)
(Continued)

(52) U.S. Cl.
CPC ......... *H04N 19/119* (2014.11); *H04N 19/174* (2014.11); *H04N 19/1883* (2014.11); *H04N 19/46* (2014.11)

(58) Field of Classification Search
CPC .............. H04N 19/119; H04N 19/174; H04N 19/1883; H04N 19/46
See application file for complete search history.

(56) References Cited

U.S. PATENT DOCUMENTS

2017/0289556 A1* 10/2017 Hendry ............ H04N 21/85406
2018/0020222 A1 1/2018 Wu et al.
(Continued)

FOREIGN PATENT DOCUMENTS

JP 2015-73213 A 4/2015
JP 2020-61701 A 4/2020
(Continued)

OTHER PUBLICATIONS

Yasugi Masanobu translation of JP 2020061701 A Oct. 2018 (Year: 2018).*
(Continued)

*Primary Examiner* — Zaihan Jiang
(74) *Attorney, Agent, or Firm* — Hauptman Ham, LLP

(57) ABSTRACT

Disclosed is a method for obtaining information on sub-units partitioned from a picture. The method comprises: decoding, from a bitstream, CTU size information indicating the size of coding tree units (CTUs) within the picture; decoding, from the bitstream, sub-picture partition information expressing sub-pictures within the picture in units of the CTU sizes; decoding, from the bitstream, partition information related to partition of the picture into one or more tiles; and decoding, from the bitstream, partition information related to partition of the picture into one or more slices.

5 Claims, 18 Drawing Sheets

(51) Int. Cl.
   *H04N 19/174*   (2014.01)
   *H04N 19/46*   (2014.01)

(56)          References Cited

U.S. PATENT DOCUMENTS

| | | | | |
|---|---|---|---|---|
| 2019/0260990 | A1 | 8/2019 | Lim et al. | |
| 2019/0394487 | A1 | 12/2019 | Lim et al. | |
| 2020/0162736 | A1* | 5/2020 | Seok | H04N 19/124 |
| 2020/0389651 | A1* | 12/2020 | Reuze | H04N 19/577 |
| 2021/0021818 | A1 | 1/2021 | Lee et al. | |
| 2021/0044838 | A1* | 2/2021 | Chen | H04N 19/96 |
| 2021/0120261 | A1* | 4/2021 | Lim | H04N 19/423 |
| 2021/0152826 | A1* | 5/2021 | Chen | H04N 19/70 |
| 2021/0176475 | A1* | 6/2021 | Hsu | H04N 19/119 |
| 2022/0248044 | A1* | 8/2022 | Chen | H04N 19/186 |

FOREIGN PATENT DOCUMENTS

| | | | | |
|---|---|---|---|---|
| JP | 2020061701 | A | * | 4/2020 |
| KR | 10-2018-0042098 | A | | 4/2018 |
| KR | 10-2019-0083959 | A | | 7/2019 |
| KR | 10-2019-0106804 | A | | 9/2019 |
| WO | 2018/160034 | A1 | | 9/2018 |

OTHER PUBLICATIONS

Martin Pettersson et al., "AHG12: Multiple tile partitions in PPS", Joint Video Experts Team (JVET) of ITU-T SG 16 WP 3 and ISO/IEC JTC 1/SC 29/WG 11, 16th Meeting: Geneva, CH, Oct. 1-11, 2019, 8 pages.
International Search Report issued Dec. 30, 2020, corresponding to International Application No. PCT/KR2020/012769.
Written Opinion issued Dec. 30, 2020, corresponding to International Application No. PCT/KR2020/012769 with its English translation.
Yasugi Masanobu translation of JP 2020-61701A (Apr. 16, 2020).
Office Action issued on Mar. 6, 2025 for corresponding Chinese Patent Application No. 202080082074.8, along with English machine translation (18 pages).
Martin Pettersson et al., "AHG12: Multiple tile partitions in PPS", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0364, pp. 1-6.

* cited by examiner (A)

(B)

(A)

(B)

(A)

(B)

(A)

(B)  (C)

(D)  (E)

START

Decode single_brick_per_slice_flag ——S1310

S1320 single_brick_per_slice_flag == 1 ?          YES

NO

Decode rect_slice_flag ——S1330

S1340 rect_slice_flag == 1
&& single_brick_per_slice_flag
== 0 ?          NO

YES

Decode num_slices_in_pic_minus1 and
bottom_right_brick_idx_length_minus1 ——S1350

Decode bottom_right_brick_idx_delta[i]
and brick_idx_delta_sign_flag[i] ——S1360

END

METHOD AND APPARATUS FOR ACQUIRING INFORMATION ABOUT SUB-UNITS SPLIT FROM PICTURE

CROSS-REFERENCE TO RELATED APPLICATION

This application is a Continuation of U.S. patent application Ser. No. 17/763,751, filed on Mar. 25, 2022, which is a national phase of PCT/KR2020/012769 filed on Sep. 22, 2020, which is based on and claims priority to Korean Patent Application No. 10-2019-0119353 filed on Sep. 27, 2019 and Korean Patent Application No. 10-2020-0113632 filed on Sep. 7, 2020, the disclosures of which are incorporated herein by reference in their entireties.

TECHNICAL FIELD

The present disclosure relates to video encoding and decoding and, more particularly, to a method and apparatus for improving encoding and decoding efficiency by efficiently obtaining information on various sub-units.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

An object of the present disclosure is to provide an improved video encoding and decoding technology to meet the needs. In particular, one aspect of the present disclosure relates to the technology for improving encoding and decoding efficiency through various methods that partition a picture into sub-units.

According to one aspect, the present disclosure provides a method for obtaining information on sub-units partitioned from a picture. The method includes: decoding, from a bitstream, CTU size information indicating the size of coding tree units (CTUs) within the picture; decoding, from the bitstream, sub-picture partition information expressing sub-pictures within the picture in units of the CTU sizes; decoding, from the bitstream, partition information related to partition of the picture into one or more tiles; and decoding, from the bitstream, partition information related to partition of the picture into one or more slices.

According to another aspect, the present disclosure provides a video decoding apparatus. The apparatus comprises to decode, from a bitstream, information on sub-units partitioned from a picture, and a picture reconstructor configured to reconstruct the picture based on the information on the sub-units. The decoder is configured to decode CTU size information indicating the size of coding tree units (CTUs) within the picture from the bitstream, decode sub-picture partition information expressing sub-pictures within the picture in units of the CTU sizes from the bitstream, decode partition information related to partition of the picture into one or more tiles from the bitstream, and decode partition information related to partition of the picture into one or more slices from the bitstream.

As described above, according to one embodiment of the present disclosure, since overlapping of syntax elements used to partition a picture into sub-units is prevented, bit efficiency may be improved.

Also, according to another embodiment of the present disclosure, whether to apply in-loop filtering between sub-unit boundaries may be reasonably designed based on a partition relationship between sub-units.

Furthermore, according to yet another embodiment of the present disclosure, since the partition information of a sub-picture is expressed in CTU units, it is possible to ensure unity with other sub-units, through which the partition information of a sub-picture may be more efficiently expressed.

DETAILED DESCRIPTION

Figure 1:
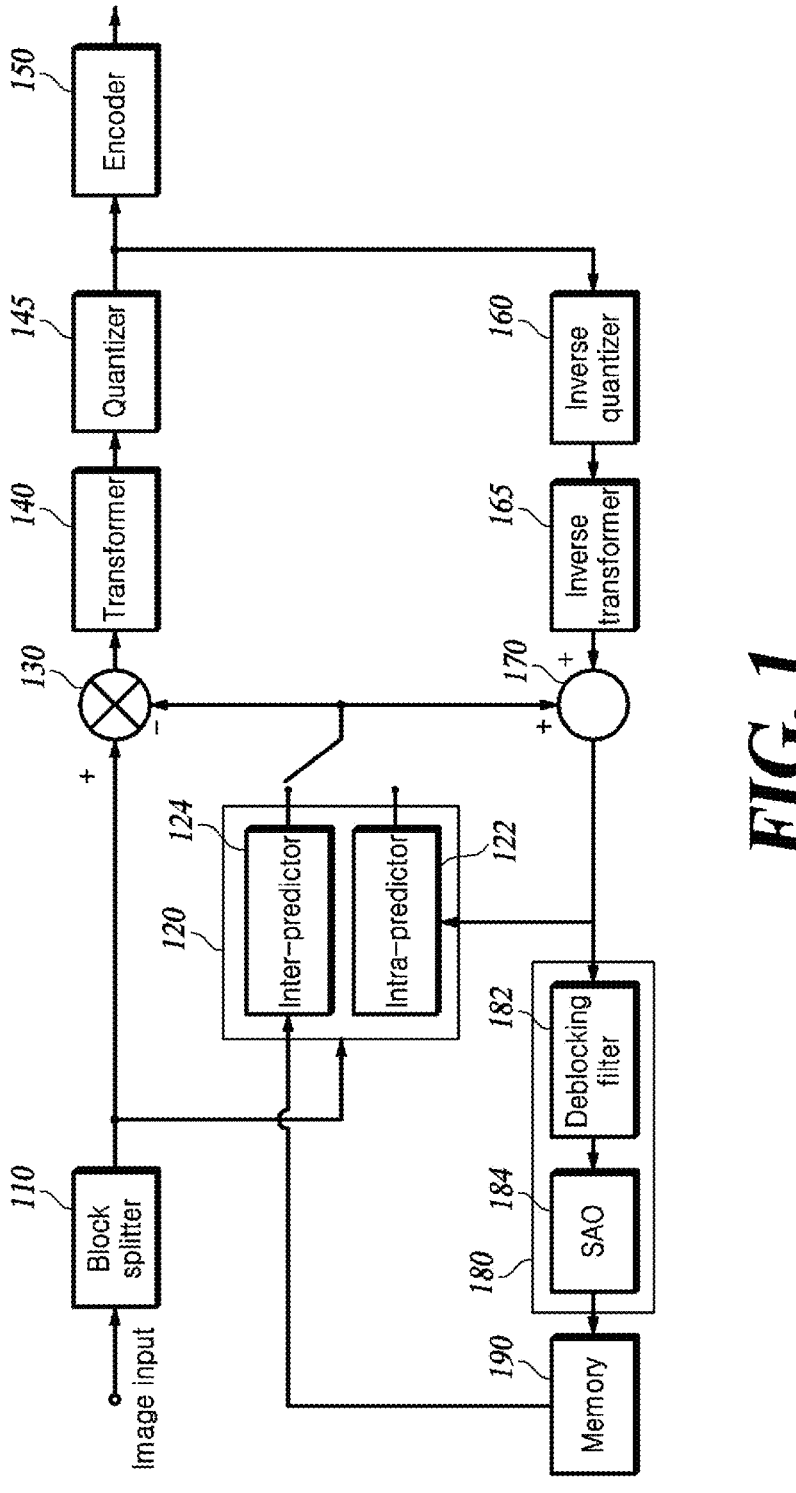
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
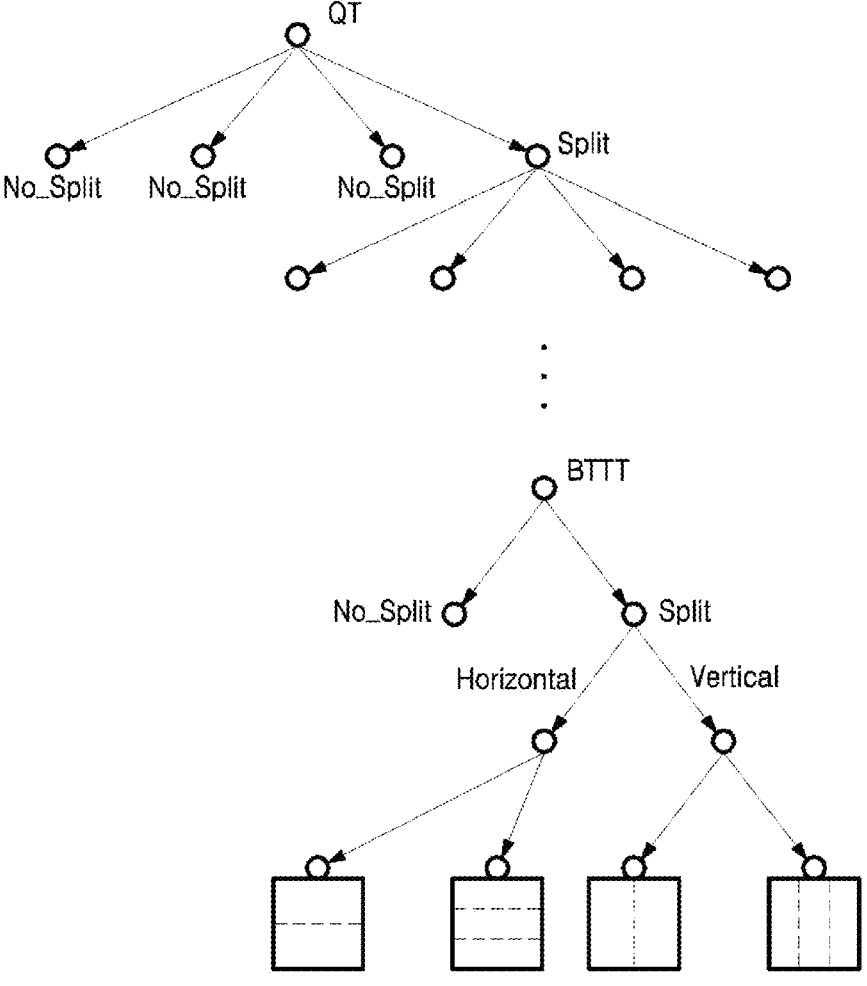
FIG. 2 exemplarily shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_ cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
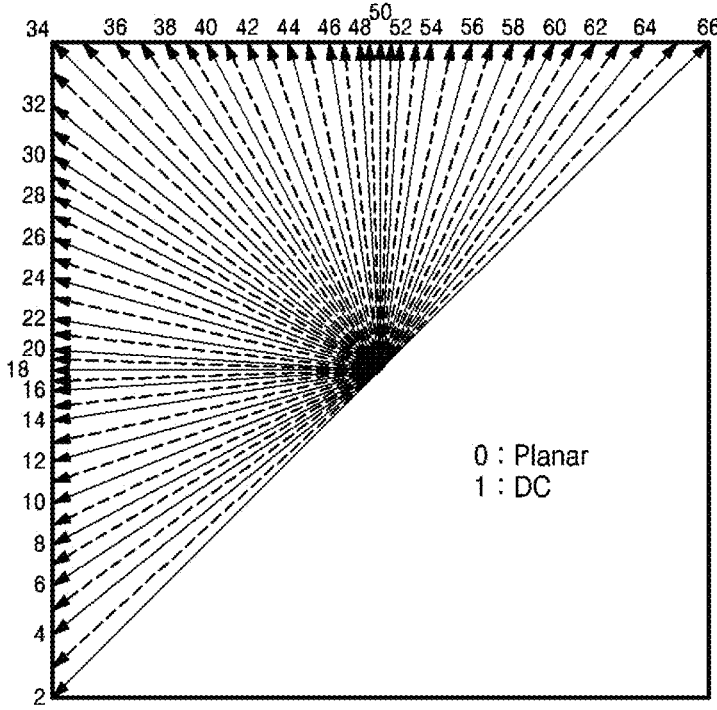
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion character-istics among the tested modes.

The intra-predictor 122 selects one intra-prediction mode from among the plurality of intra-prediction modes, and predicts the current block using neighboring pixels (refer-ence pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corre-sponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtract-ing the predicted block generated by the intra-predictor 122 or the inter-predictor 124 from the current block.

The transformer 140 transforms a residual signal in a residual block having pixel values in the spatial domain into a transform coefficient in the frequency domain. The trans-former 140 may transform the residual signals in the residual block using the total size of the current block as a transfor-mation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) infor-mation (cu_sbt_horizontal_flag), and/or location informa-tion (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the split-ting is additionally encoded signaled to the video decoding apparatus by the encoder 150.

The quantizer 145 quantizes transform coefficients output from the transformer 140, and outputs the quantized trans-form coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quan-tized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and trans-formation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Meanwhile, the picture encoder partitions a picture into sub-units and encodes the picture in CU units included in the sub-units. The picture encoder may include the remaining components other than the encoder 150 among components included in the video encoding apparatus. The encoder 150 encodes information on sub-units partitioned from a picture and signals the encoded information to the video decoding apparatus. A method for encoding information on sub-units by the encoder 150 will be described in detail below.

Figure 4:
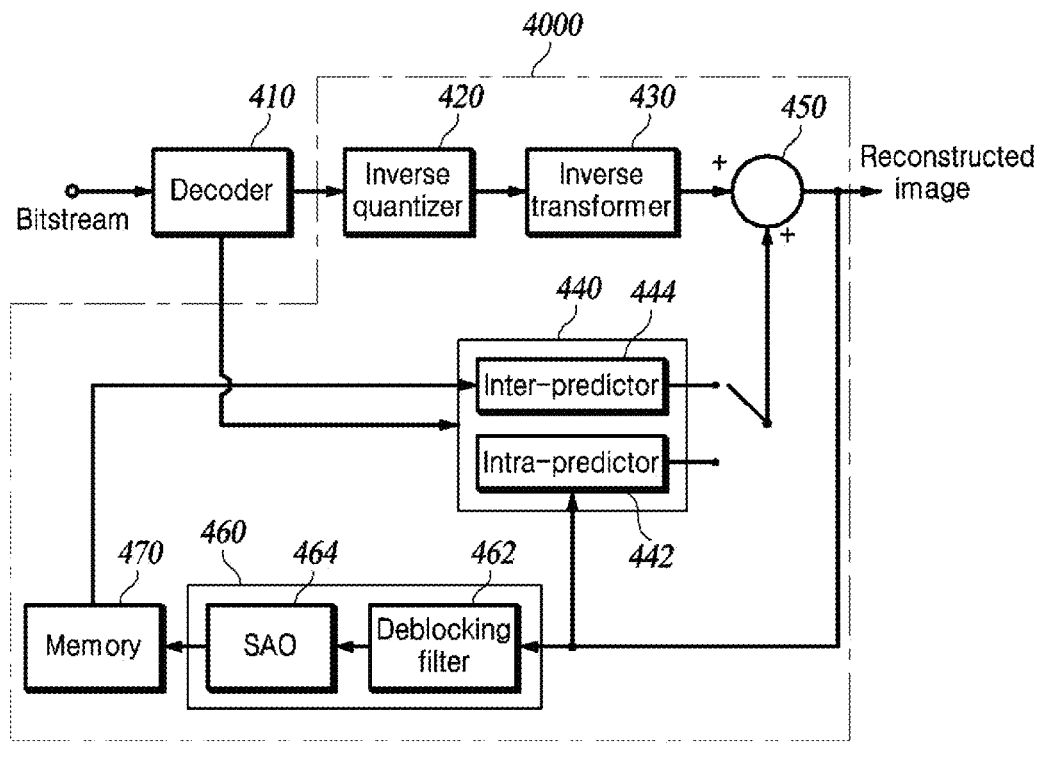
FIG. 4 is an exemplary block diagram of a video decoding apparatus capable of implementing the techniques of the present disclosure.

FIG. 4 is an exemplary functional block diagram of a video decoding apparatus capable of implementing the tech-niques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be imple-mented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on a syntax element for the inter-prediction information extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Meanwhile, the decoder 410 obtains information on the sub-units partitioned from a picture by decoding a bitstream. The picture reconstructor 4000 reconstructs the picture based on the obtained information on the sub-units. The picture reconstructor 4000 may include the remaining components other than the decoder 410 among components included in the video decoding apparatus. A method for obtaining information on sub-units by the decoder 410 will be described in detail below.

There are two types of methods of partitioning a picture (an image or a screen) for purpose of parallel processing in the HEVC international standard. One is a slice partitioning method, and the other is a tile partitioning method.

1) The slice partitioning method provides a function of partitioning the picture into CTUs and encoding/decoding the CTUs by in raster scan order. Several slice segments may exist in one slice, and there are two types of slice segments. The types of slice segments include an independent slice segment and a dependent slice segment.

The independent slice segment is a slice segment that does not depend on another slice at the time of intra prediction, inter prediction, coding mode, and entropy coding. Independent slice segments have header information. The dependent slice segment is a slice segment that depends on another slice (referencing another preceding independent slice segment) at the time of intra prediction, inter prediction, coding mode, and entropy coding. The dependent slice segment refers to the header information of a preceding independent slice segment for most of the header information of the dependent slice segment. In other words, only a part of the header information of the dependent slice segment is signaled.

Figure 5:
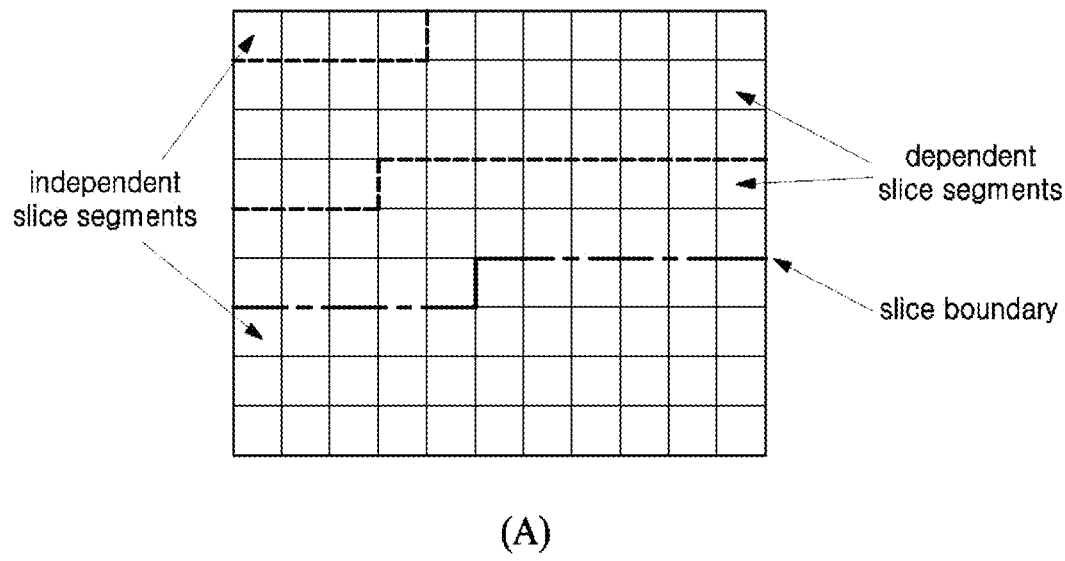
FIGS. 5 to 8 illustrate a slice, a tile, and a sub-picture.
Figure 5:
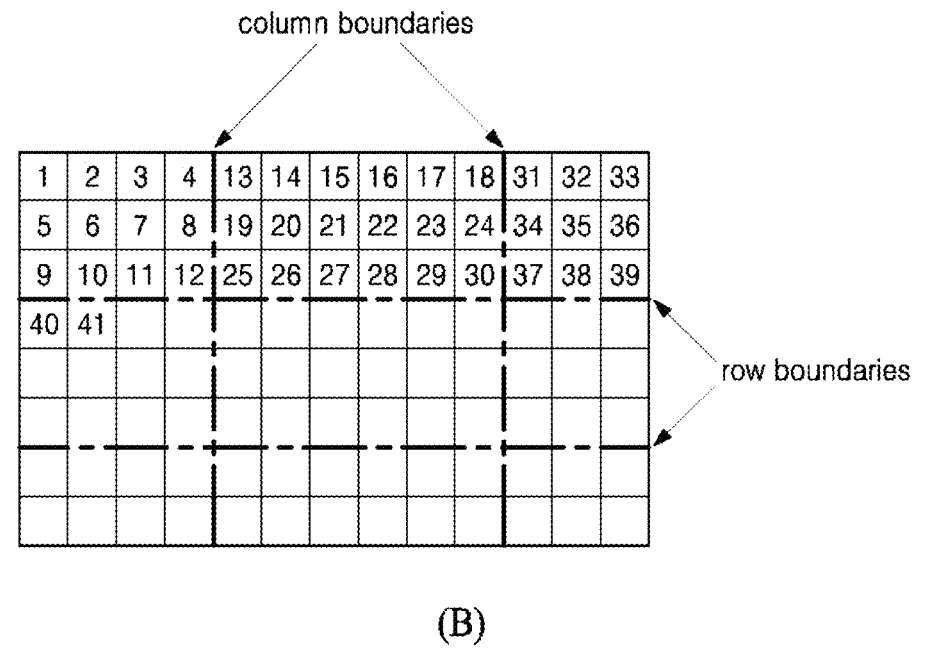

FIG. 5(A) shows two slices partitioned from a picture, and the two slices may be separated by a slice boundary. One slice may include one independent slice segment and zero or more dependent slice segments. The first slice in the upper part of the picture has one independent slice segment and two dependent slice segments separated by dotted lines. The second slice in the lower part of the picture has only one independent slice segment (including zero dependent slice segments).

Tables 1 and 2 show the syntax structure for the slice partitioning method.

TABLE 1

| | Descriptor |
|---|---|
| pic_parameter_set_rbsp( ) { | |
| pps_pic_parameter_set_id | ue(v) |
| pps_seq_parameter_set_id | ue(v) |
| dependent_slice_segments_enabled_flag | u(1) |
| ... | |
| } | |

TABLE 2

| | Descriptor |
|---|---|
| slice_segment_header( ) { | |
| first_slice_segment_in_pic_flag | u(1) |
| if( nal_unit_type >= BLA_W_LP && nal_unit_type <= RSV_IRAP_VCL23) | |
| no_output_of_prior_pics_flag | u(1) |
| slice_pic_parameter_set_id | ue(v) |
| if( !first_slice_segment_in_pic_flag) { | |
| if( dependent_slice_segments_enabled_flag ) | |
| dependent_slice_segment_flag | u(1) |
| slice_segment_address | u(v) |
| } | |
| if( !dependent_slice_seginent_flag ) { | |
| . . . | |
| } | |
| if(tiles_enabled_flag \| \| entropy_coding_syne_enabled_flag) | |
| { | |
| num_entry_point_offsets | ue(v) |
| if( num_entry_point_offsets> 0 ) { | |
| offset_len_minus1 | ue(v) |
| for( i = 0; i < num_entry_point_offsets; i++) | |
| entry_point_offset_minus1[ i ] | u(v) |
| } | |
| } | |
| ... | |
| } | |

Table 1 shows a flag (dependent_slice_segments_enabled_flag) that indicates whether dependent slice segments are allowed to be used. The flag may be defined by the PPS. Table 2 shows slice segment header information.

As shown in Table 2, a flag (first_slice_segment_in_pic_flag) indicating whether a specific slice segment is the first slice segment in a picture is encoded and signaled. The first slice segment becomes an independent slice segment. For a slice segment other than the first slice segment, a flag (dependent_slice_segment_flag) indicating whether the slice segment is a dependent slice segment is encoded and signaled. Also, the address (slice_segment_address) of the related slice segment is signaled together. Here, slice_segment_address means an index value of the first CTU in the related slice segment.

2) The tile partitioning method provides a function of encoding/decoding a picture by segmenting/partitioning the picture into a plurality of columns and rows on a basis of CTUs. A picture may be partitioned into tiles based on a uniform partitioning scheme or an individual (non-uniform) partitioning scheme.

Each partitioned tile does not depend on other tiles during intra prediction and entropy coding, and reliance on in-loop filtering is controllable by a flag defined in the PPS. A separate header for a tile does not exist.

FIG. 5(B) shows a picture partitioned into 3×3 tiles, and each tile may be separated by tile boundaries (column boundaries and row boundaries). A plurality of tiles may be encoded/decoded in raster scan order, and a plurality of CTUs in one tile may also be encoded/decoded in raster scan order. Numbers shown in each CTU indicate the order in which encoding/decoding is performed.

The syntax structure for the tile partitioning method is shown in Table 3.

TABLE 3

| | Descriptor |
|---|---|
| pic_parameter_set_rbsp) { | |
| tiles_enabled_flag | u(1) |
| if( tiles _enabled_flag ) { | |
| num_tile_columns_minus1 | ue(v) |
| num_tile_rows_minus1 | ue(v) |
| uniform_spacing_flag | u(1) |
| if( !uniform_spacing_flag) { | |
| for( i = 0; i < num_tile_columns_minus1;i+++ ) | |
| column_width_minus1[ i ] | ue(v) |
| for i = 0; i < num_tile_rows_minus 1 i++ ) | |
| row_height_minus1[ i ] | ue(v) |
| } | |
| loop_filter_across_tiles_enabled_flag | u(1) |
| } | |

As shown in Table 3, a flag (tiles_enabled_flag) indicating on/off of the tile partitioning is defined and signaled in the PPS. When the related flag is on, syntax elements specifying the tile size are additionally signaled.

The syntax elements specifying the tile size may include num_tile_columns_minus1 indicating a value obtained by subtracting 1 from the number of tiles (the number of tile columns) partitioned in the vertical direction, num_tile_rows_minus1 indicating a value obtained by subtracting 1 from the number of tiles (the number of tile rows) partitioned in the horizontal direction, and uniform_spacing_flag indicating whether the picture is partitioned uniformly in the horizontal and vertical directions.

When the picture is not evenly partitioned (uniform_spacing_flag=off), width information (column_width_minus1) of a tile column and height information (row_height_minus1) of a tile row are additionally signaled. Also, a flag (loop_filter_across_tiles_enabled_flag) indicating whether in-loop filtering is applied at the boundary between tiles is signaled.

Figure 6:
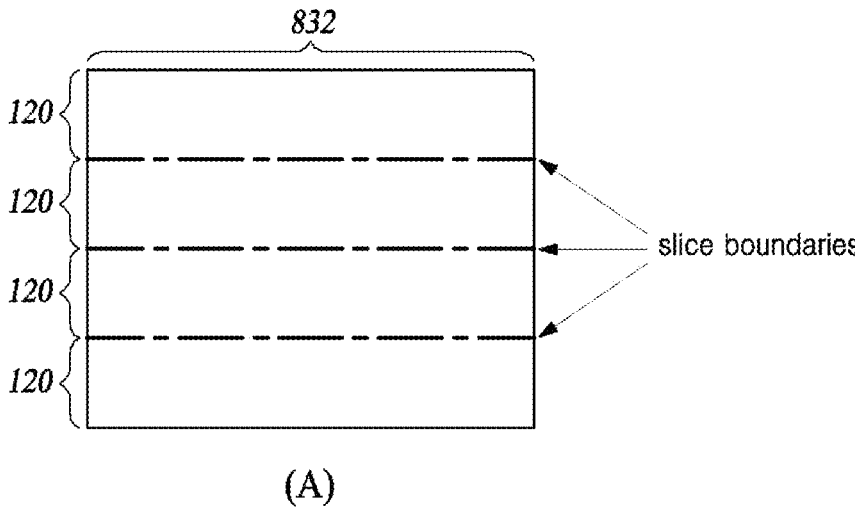
Figure 6:
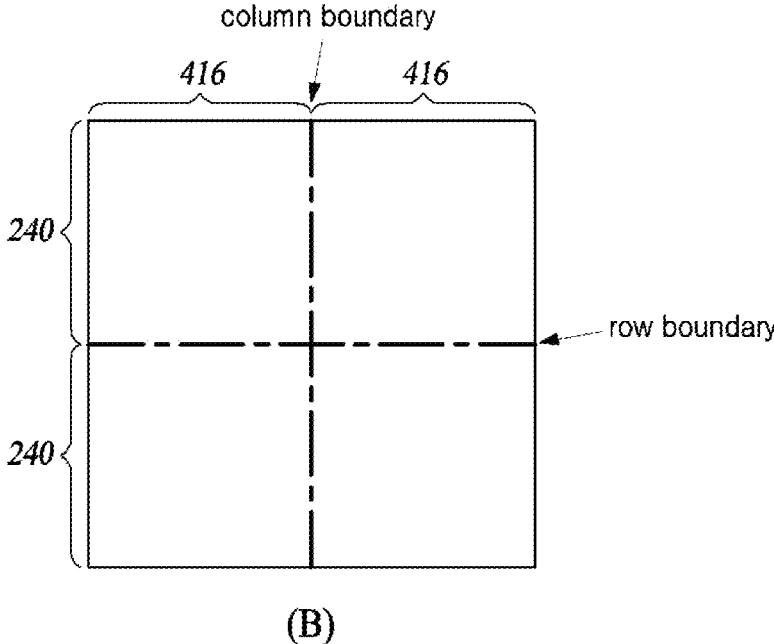

FIG. 6 shows a difference between the slice partitioning method and the tile partitioning method described above. FIG. 6(A) shows slices (a total of 4 slices) partitioned according to the slice partitioning method, and FIG. 6(B) shows tiles (a total of 4 tiles) partitioned according to the tile partitioning method. Each number represents the number of CTUs.

Only horizontal boundaries may exist between the partitioned slices. In contrast, horizontal and vertical boundaries may exist between the partitioned tiles.

The present disclosure proposes a method for obtaining information on sub-units partitioned from a picture.

Sub-units (sub-blocks or sub-regions) may include one or more of a sub-picture, a slice, a tile/brick, and a CTU. The information on the sub-units may include an enable flag and partition information of the sub-units.

The enable flag is a syntax element indicating whether in-loop filtering is performed at the boundary between sub-units. The partition information of sub-units corresponds to the information for partitioning a picture into various sub-units. Accordingly, "acquiring the partition information of the sub-units" may be "partitioning a picture into sub-units."

The present disclosure proposes picture partitioning methods for various purposes based on partition information of sub-units. Specifically, the present disclosure proposes 1) a sub-picture partitioning method for synthesizing different sequences, 2) a slice partitioning method for bitstream packing, and 3) a tile/brick partitioning method for parallel processing.

Tile/Brick, Slice, and Sub-Picture

A tile/brick means a picture region obtained by partitioning the picture into sub-regions to process the picture in parallel. Tiles/bricks are processed independently during intra prediction and entropy coding. In other words, tiles/bricks do not share a reference sample during intra prediction and do not share context during entropy coding. Whether to apply in-loop filtering to the boundary between tiles/bricks may be controlled through a separate flag.

A slice means a data packing unit that configures one independent network abstraction layer (NAL) bitstream. A plurality of tiles/bricks may be included in one slice, or a plurality of slices may be included in one tile/brick.

A slice may have two types or modes. The first mode is a rectangular slice mode in which tiles/bricks having similar characteristics or arbitrary tiles/bricks are designated as one region, and the second mode is a non-rectangular slice (raster-scan slice) mode in which tiles/bricks are designated as one region at specific locations while encoding/decoding of tiles/bricks progresses in raster-scan order.

Figure 7:
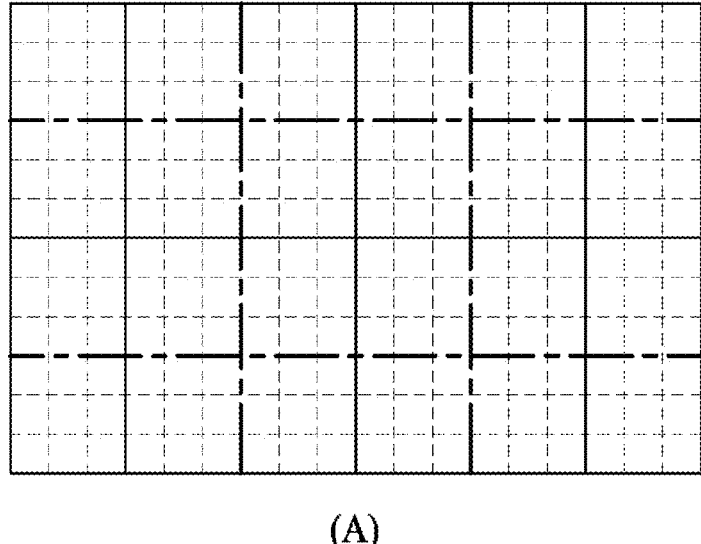
Figure 7:
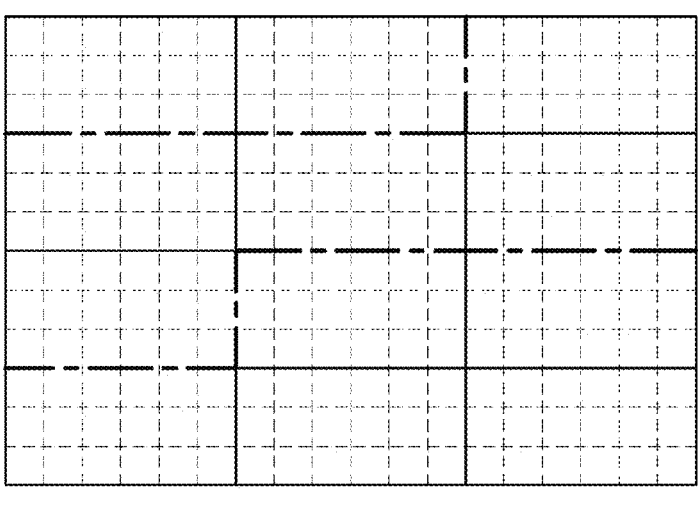

Examples of the rectangular slice mode and the raster scan slice mode are shown in FIG. 7. In FIG. 7, an area separated by a dotted line represents a CTU, an area separated by a straight line represents a tile/brick, and an area separated by a dash-dotted line represents a slice.

As shown in FIG. 7(A), one picture may be partitioned into a total of 216 (18×12) CTUs, a total of 24 (6×4) tiles/bricks, and a total of 9 rectangular slices. As shown in FIG. 7 (B), one picture may be partitioned into a total of 216 (18×12) CTUs, a total of 12 (3×4) tiles/bricks, and a total of 3 raster scan slices.

A sub-picture refers to a region designated for synthesis with other content. A sub-picture may include at least one slice.

Figure 8:
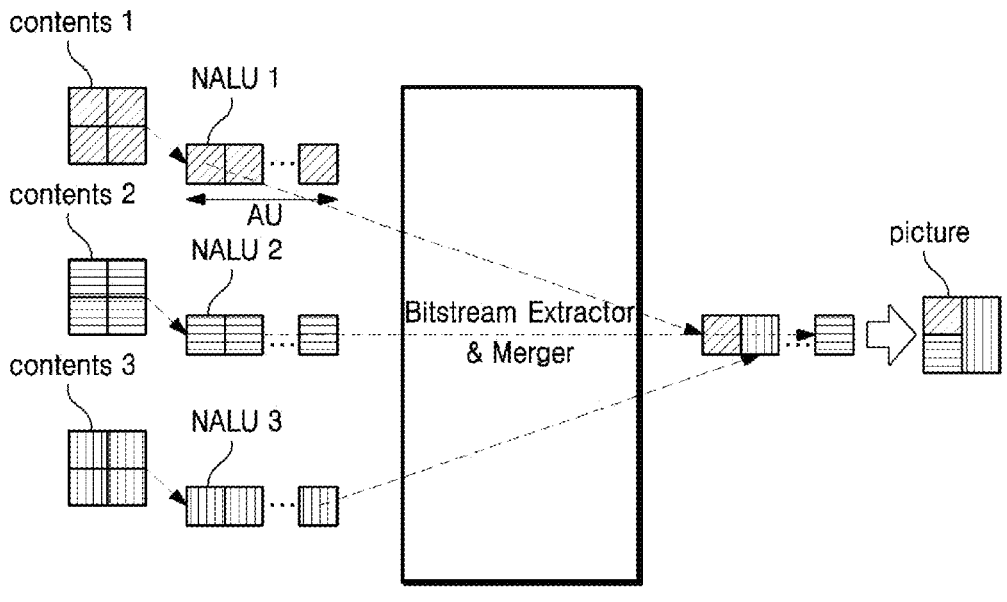

FIG. 8 shows an example in which different contents are synthesized in units of sub-pictures. The area filled with oblique lines in the upper right direction means a picture in content 1. The area filled with a pattern of horizontal lines means a picture in content 2. The area filled with a pattern of vertical lines means a picture in content 3.

As shown on the left side of FIG. 8, each picture may be composed of four slices, and a bitstream may be generated for each slice unit. Also, each slice may be defined as a sub-picture. Bitstreams generated physically in units of slices are input to the bitstream extractor & merger and undergo an extraction and synthesis process. Here, a logical unit of the extraction and synthesis process is a sub-picture. As a result, as shown on the right side of FIG. 8, a new picture, in which the upper left part is content 1, the lower left part is content 2, and the right part is content 3, is generated from the synthesis.

The bitstream extractor & merger extracts bitstreams generated in slice units from different contents and synthesizes the extracted bitstreams in sub-picture units. To this end, a picture of each content is partitioned into sub-pictures. In other words, a sub-picture is an area including at least one slice for content synthesis.

Figure 9:
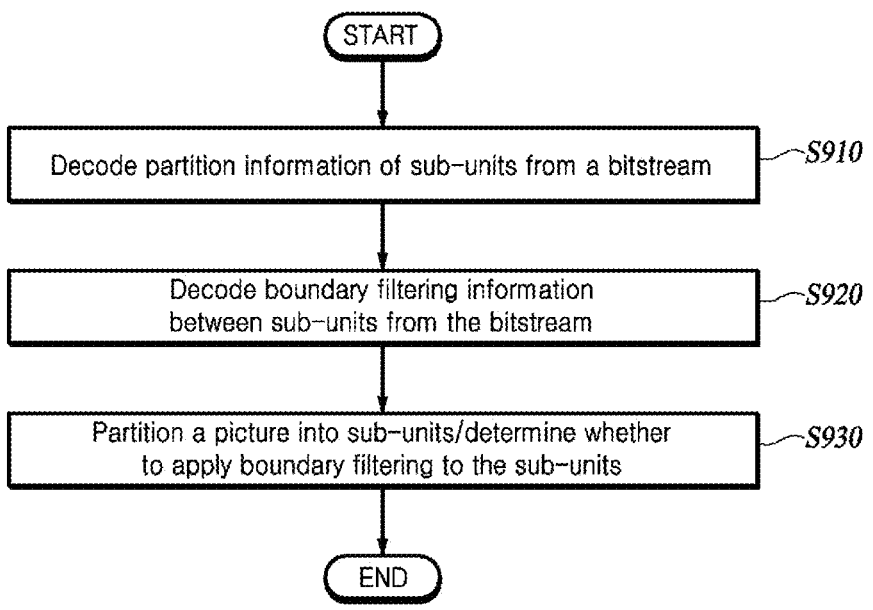
FIG. 9 is a flow diagram illustrating one example of a method capable of implementing techniques of the present disclosure.

In what follows, a method of obtaining information on sub-units will be described. FIG. 9 shows a flowchart illustrating one embodiment of the present disclosure.

The video encoding apparatus may partition a picture into various sub-units. After being partitioned into a plurality of CTUs having a predetermined size, the picture may be partitioned into sub-pictures, tiles/bricks, and slices by using the CTU size as a basic unit.

For example, a picture may be partitioned into one or more sub-pictures based on the CTU size as a basic unit and may be partitioned into one or more tiles/bricks based on CTU size as a basic unit. In the case of slice partitioning, a picture may be partitioned into one or more slices based on a tile/brick as a basic unit. Here, since a tile/brick is partitioned based on the CTU size as a basic unit, the slice is accordingly partitioned based on the CTU size as the basic unit.

Accordingly, information on sub-picture partitioning (sub-picture partition information) may express a sub-picture within a picture in units of the CTU sizes, information on tile/brick partitioning (tile/brick partition information) may express a tile/brick within the picture in units of the CTU sizes, and information on slice partitioning (slice partition information) may express a slice within the picture in tile/brick units (size units of CTUs).

The information on the CTU size (CTU size information), sub-picture partition information, tile/brick partition information, and slice partition information are encoded and signaled to the video decoding apparatus. The CTU size information is defined and signaled at the SPS level or PPS level, the sub-picture partition information is defined and signaled at the SPS level, and the tile/brick partition information and the slice partition information are defined and signaled at the PPS level.

Also, the video encoding apparatus determines whether in-loop filtering is applied to a boundary between sub-units, encodes an enable flag indicating whether in-loop filtering is applied, and signals the encoded enable flag to the video decoding apparatus.

An enable flag indicating whether in-loop filtering is applied to the boundary between sub-pictures is defined and signaled at the SPS level; an enable flag indicating whether in-loop filtering is applied to the boundary between tiles/bricks and an enable flag indicating whether in-loop filtering is applied to the boundary between slices are defined and signaled at the PPS level.

The decoder 410 decodes the partition information of sub-units from a bitstream (S910). The CTU size information, sub-picture partition information, tile/brick partition information, and slice partition information included in the partition information of sub-units are obtained by being decoded from the bitstream. The decoder 410 partitions a picture into sub-units based on the obtained partition information (S930). Specifically, after being partitioned into CTUs having the CTU size indicated by the CTU size information, a picture may be partitioned into sub-pictures, tiles/bricks, and slices based on sub-picture partition information, tile/brick partition information, and slice partition information.

The decoder 410 decodes, from a bitstream, an enable flag indicating whether in-loop filtering is applied to a boundary between sub-units (S920). The filter 460 determines whether in-loop filtering is applied to the boundary between sub-units based on the enable flag (S930).

Embodiment 1

Embodiment 1 discloses a method for obtaining tile partition information and a method for obtaining brick partition information. In other words, embodiment 1 relates to a method for partitioning a picture into tiles and a method for partitioning a picture into bricks.

Table 4 shows one example of a syntax structure related to embodiment 1.

TABLE 4

| | De-scriptor |
|---|---|
| pic_parameter_set_rbsp( ) { | |
| single_tile_in_pic_flag | u(1) |
| if( !single_tile_in_pic_flag ) { | |
| uniform_tile_spacing_flag | u(1) |
| if( uniform_tile_spacing_flag) { | |
| tile_cols_width_minus1 | ue(v) |
| tile_rows_height_minus1 | ue(v) |
| } else { | |
| num_tile_columns_minus1 | ue(v) |
| num_tile_rows_minus1 | ue(v) |
| for i = 0; i <num_tile_columns_minus 1; i++ ) | |
| tile_column_width_minus1[ i ] | ue(v) |
| for i = 0; i < num_tile_rows_minus1; i+ ) | |
| tile_row_height_minus1[ i ] | ue(v) |
| } | |
| brick_splitting_present_flag | u(1) |
| if( uniform_tile_spacing_flag && brick_splitting_present_flag) | |
| num_tiles_in_pic_minus1 | ue(v) |
| for( i = 0 ; brick_splitting_present_flag && i <= num_tiles_in _pic_minus1 + 1; i++ ) { | |
| if( RowHeight[ i] > 1) | |
| brick_split_flag[ i ] | u(1) |
| if( brick split_flag[ i ]) { | |
| if( RowHeight[ i ] > 2) | |
| uniform_brick_spacing_flag[ i ] | u(1) |
| if( uniform_brick_spacing_flag[ i ] ) | |
| if( RowHeight[ i ] > 3 ) | |
| brick_height_minus1[ i ] | ue(v) |
| else { | |
| if( RowHeight[ i ] > 3 ) | |
| num_brick_rows_minus2[ i ] | ue(v) |
| for( j = 0; <= num_brick_rows_minus2[ i ]; j++ ) | |
| brick_row_height_minus1[ i ][ j ] | ue(v) |
| } | |
| } | |
| } | |
| } | |

Embodiment 1-1

Figure 10:
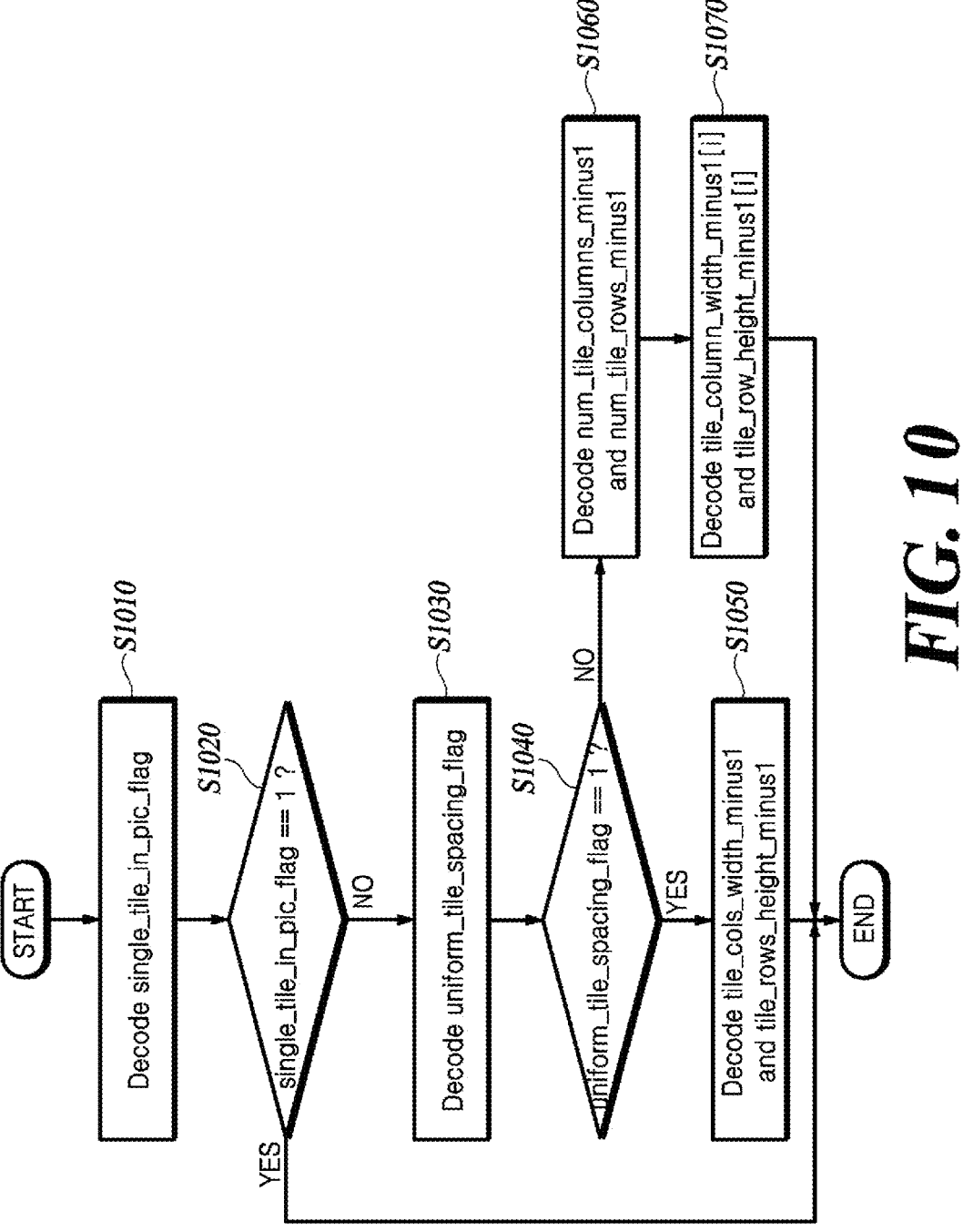
FIG. 10 is a flow diagram illustrating one example of a method for partitioning a picture into tiles.

Embodiment 1-1 relates to a method for partitioning a picture into tiles (a method for obtaining tile partition information). FIG. 10 shows an example of embodiment 1-1.

The video encoding apparatus determines whether there is only one tile within a picture and sets the determination result as a value of the single_tile_in_pic_flag syntax element. When single_tile_in_pic_flag==1, it indicates that only one tile exists in the picture, and when single_tile_in_pic_flag==0, it indicates that one or more tiles exist in the picture.

In the existence of one or more tiles within a picture (single_tile_in_pic_flag==0), the video encoding apparatus determines whether the corresponding one or more tiles are uniformly partitioned and sets the determination result as a value of the uniform_tile_spacing_flag syntax element. When uniform_tile_spacing_flag==1, it indicates that tiles are uniformly partitioned from the picture, and when uniform_tile_spacing_flag==0, it indicates that the tiles are not uniformly partitioned from the picture.

When tiles are uniformly partitioned (uniform_tile_spacing_flag==1), the video encoding apparatus determines the width of a tile column and the height of a tile row and sets the determination results as a value of tile_cols_width_minus1 syntax element and as a value of the tile_rows_height_minus1 syntax element, respectively. tile_cols_width_minus1 is a syntax element carrying the width of a tile column in the CTU size units, except for the width of the rightmost tile column of the picture. tile_rows_height_minus1 is a syntax element carrying the height of a tile row in the CTU size units, except for the height of a tile row at the bottom of the picture.

When tiles are not uniformly partitioned (uniform_tile_spacing_flag==0), the video encoding apparatus determines the number of tile columns and the number of tile rows and sets the determination results as a value of a num_tile_columns_minus1 syntax element and as a value of num_tile_rows_minus1 syntax element, respectively. num_tile_columns_minus1 is a syntax element carrying a value obtained by subtracting 1 from the number of tile columns, and num_tile_rows_minus1 is a syntax element carrying a value obtained by subtracting 1 from the number of tile rows.

The video encoding apparatus determines the widths of tile columns not uniformly partitioned and the heights of tile rows not uniformly partitioned and sets the determination results as a value of the tile_column_width_minus1[i] syntax element and as a value of the tile_row_height_minus1[i] syntax element, respectively. tile_column_width_minus1[i] is a syntax element indicating the widths of tile columns not uniformly partitioned in the CTU size units. The syntax element is not defined for the width of the rightmost tile column of the picture. tile_row_height_minus1[i] is a syntax element indicating the height of tile rows not uniformly partitioned. The syntax element is not defined for the height of the tile row at the bottom of the picture.

The video encoding apparatus encodes single_tile_in_pic_ flag, uniform_tile_spacing_flag, tile_cols_width_minus1, tile_rows_height_minus1, num_tile_columns_minus1, num_tile_rows_minus1, tile_column_width_minus1[i], and tile_row_height_minus1[i] and signals them to the video decoding apparatus.

The decoder 410 decodes single_tile_in_pic_flag from a bitstream (S1010) and determines whether there is only one tile within a picture or whether one or more tiles are present in the picture based on the value of single_tile_in_pic_flag (S1020).

When only one tile exists within a picture (single_tile_in_pic_flag==1), the decoder 410 treats the picture as one tile and terminates the tile partitioning process. On the other hand, when one or more tiles exist in the picture (single_tile_in_pic_flag==0), the decoder 410 decodes the uniform_tile_spacing_flag from a bitstream (S1030).

The decoder 410 determines whether tiles in a picture are uniformly partitioned based on the decoded uniform_tile-

15

_spacing_flag value (S1040). When the tiles are uniformly partitioned (uniform_tile_spacing_flag==1), the decoder 410 decodes tile_cols_width_minus1 and tile_rows_height_minus1 from the bitstream (S1050). On the other hand, when tiles are not uniformly partitioned (uniform_tile_spacing_flag==0), the decoder 410 decodes num_tile_columns_minus1 and num_tile_rows_minus1 from the bitstream (S1060) and decodes as many tile_column_width_minus1[i] and tile_row_height_minus1[i] as respectively indicated by num_tile_columns_minus1 and num_tile_rows_minus1 from the bitstream (S1070).

The decoder 410 may partition a picture into non-uniform tiles based on the values of num_tile_columns_minus1, num_tile_rows_minus1, tile_column_width_minus1[i], and tile_row_height_minus1[i] or partition the picture uniformly into tiles based on the values of tile_cols_width_minus1 and tile_rows_height_minus1.

Embodiment 1-2

Figure 11:
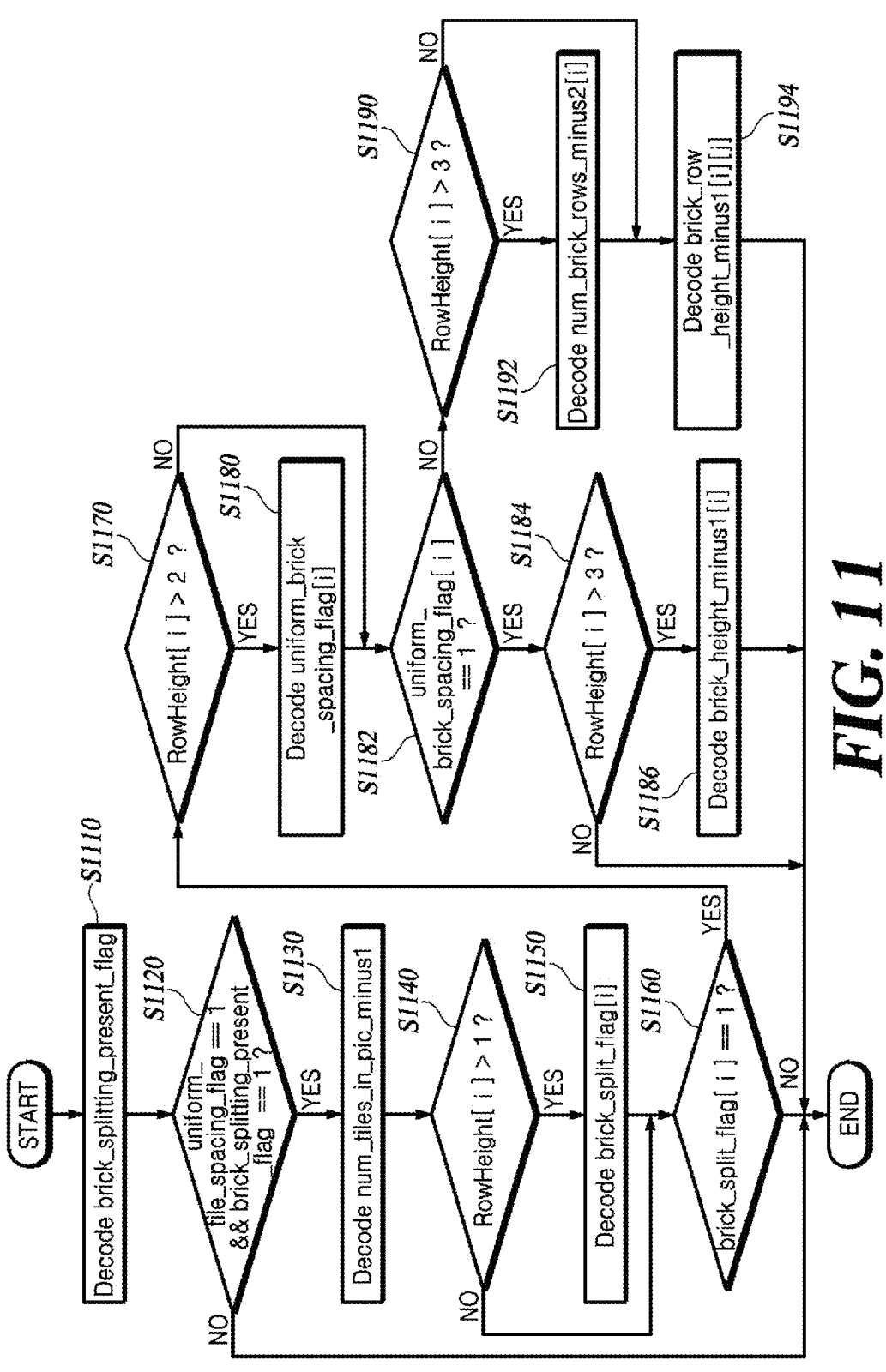
FIG. 11 is a flow diagram illustrating one example of a method for partitioning a picture into bricks.

Embodiment 1-2 relates to a method for partitioning a picture into bricks (a method for obtaining brick partition information). Partitioning of a picture into bricks is allowed only in the horizontal direction. FIG. 11 shows one example of embodiment 1-2.

The video encoding apparatus may determine whether a tile within a picture is partitioned into a plurality of bricks and set the determination result as a value of a brick_splitting_present_flag syntax element. When brick_splitting_present_flag==1, it indicates that one or more tiles in the picture are partitioned into a plurality of bricks, and when brick_splitting_present_flag==0, it indicates that a tile split into a plurality of bricks does not exist in the picture. The brick_splitting_present_flag is encoded and signaled to the video decoding apparatus.

The video encoding apparatus may determine the number of tiles in a picture and set the determination result as a value of a num_tiles_in_pic_minus1 syntax element. When tiles in a picture are uniformly partitioned (uniform_tile_spacing_flag==1) and one or more tiles in the picture are partitioned into a plurality of bricks (brick_splitting_present_flag==1), num_tiles_in_pic_minus1 is encoded and signaled to the video decoding apparatus.

The video encoding apparatus checks the height of the i-th tile (the number of CTU rows in the i-th tile, RowHeight[i]) and, based on the result, sets the values of syntax elements of brick_split_flag[i], uniform_brick_spacing_flag[i], brick_height_minus1[i], num_brick_rows_minus2[i], and brick_row_height_minus1[i][j].

brick_split_flag[i] is a syntax element indicating whether the i-th tile is partitioned into bricks. When the value of RowHeight[i] exceeds 1, brick_split_flag[i] may be set to "1," which is a value indicating that the i-th tile is partitioned into bricks and is encoded and signaled to the video decoding apparatus. This is because brick partitioning in the horizontal direction is possible when the value of RowHeight[i] exceeds 1. On the other hand, brick_split_flag[i] is set to "0," which is a value indicating that the i-th tile is not partitioned into bricks when the value of RowHeight[i] is 1 or less and is not signaled to the video decoding apparatus. This is because, when the value of RowHeight[i] is 1 or less, brick partitioning in the horizontal direction is impossible.

uniform_brick_spacing_flag[i] is a syntax element indicating whether the i-th tile is uniformly partitioned into bricks. When the value of RowHeight[i] exceeds 2, both uniform and non-uniform partitioning are possible, and therefore, uniform_brick_spacing_flag[i] may be set to "1," a value indicating uniform partitioning or "0," a value indicating non-uniform partitioning. In this case, uniform_brick_spacing_flag[i] may be encoded and signaled to the video decoding apparatus. On the other hand, when the value of RowHeight[i] is 2 or less, only 1:1 uniform partitioning is possible, and therefore, uniform_brick_spacing_flag[i] is set to "1" and is not signaled to the video decoding apparatus.

brick_height_minus1[i] is a syntax element indicating a value obtained by subtracting 1 from the height of uniformly partitioned brick rows in units of the CTU sizes. The syntax element is not defined for the height of a brick row at the bottom within the i-th tile. brick_height_minus1[i] is encoded and signaled to the video decoding apparatus when the bricks are uniformly partitioned, when the value of RowHeight[i] exceeds 3. On the contrary, when the bricks are uniformly partitioned and the value of RowHeight[i] is 3, only 1:1:1 uniform partitioning is possible, and therefore, brick_height_minus1[i] is set to 0 (brick_height_minus1[i]==0) and is not signaled to the video decoding apparatus.

num_brick_rows_minus2[i] is a syntax element indicating a value obtained by subtracting 2 from the number of unevenly partitioned bricks. num_brick_rows_minus2[i] is encoded and signaled to the video decoding apparatus when the bricks are partitioned unevenly, and the value of RowHeight[i] exceeds 3. On the other hand, when the bricks are unevenly partitioned and the value of RowHeight[i] is 3, only non-uniform partitioning of 1:2 or 2:1 is possible, and therefore, num_brick_rows_minus2[i] is set to 0 (num_brick_rows_minus2[i]==0) and is not signaled to the video decoding apparatus.

brick_row_height_minus1[i][j] is a syntax element indicating, in the unit of the CTU size, a value obtained by subtracting 1 from the height of the j-th brick row among unevenly partitioned brick rows. For example, brick_row_height_minus1[i][j] is set to a value obtained by subtracting 1 from each of the heights of two bricks when the number of unevenly partitioned bricks is 3 (num_brick_rows_minus2[i]==1). In another example, brick_row_height_minus1[i][j] is set to a value obtained by subtracting 1 from each of the heights of four bricks when the number of unevenly partitioned bricks is 5 (num_brick_rows_minus2[i]==3). brick_row_height_minus1[i][j] is encoded and signaled to the video decoding apparatus.

The decoder 410 decodes brick_splitting_present_flag from a bitstream (S1110) and determines a value of the decoded brick_splitting_present_flag (S1120).

When tiles within a picture are uniformly partitioned (uniform_tile_spacing_flag==1) and one or more tiles within the picture are partitioned into a plurality of bricks (brick_splitting_present_flag==1), the decoder 410 decodes num_tiles_in_pic_minus1 from the bitstream (S1130). When tiles within a picture are unevenly partitioned (uniform_tile_spacing_flag==0) or when no tile within the picture is partitioned into a plurality of bricks (brick_splitting_present_flag==0), num_tiles_in_pic_minus1 is not signaled, and the value of num_tiles_in_pic_minus1 is set to or derived as a value obtained by subtracting 1 from the number of tiles within the picture.

The decoder 410 checks the number of CTU rows (RowHeight[i]) in the i-th tile (S1140) and decodes brick_split_flag from the bitstream when RowHeight[i]>1 (S1150). When the value of RowHeight[i] is 1 or less, brick_split_flag is not signaled, and the value of brick_split_flag is derived as or set to 0.

The decoder 410 terminates the brick partitioning when brick_split_flag==0 (S1160), but determines the value of RowHeight[i] when brick_split_flag==1 (S1170). When the value of RowHeight[i] exceeds 2, uniform_brick_spacing_flag is decoded from the bitstream (S1180), but when the value of RowHeight[i] is 2 or less, uniform_brick_spacing_flag is not decoded, and the value thereof is set to or derived as 1.

The decoder 410 determines whether bricks are uniformly partitioned based on the value of uniform_brick_spacing_flag (S1182) and determines the value of RowHeight[i] (S1184, S1190). The decoder 410 decodes brick_height_minus1[i] from the bitstream when uniform_brick_spacing_flag==1 and when the value of RowHeight[i] exceeds 3 (S1186). On the other hand, when uniform_brick_spacing_flag==1 and the value of RowHeight[i] does not exceed 3, brick_height_minus1[i] is not decoded, and the value thereof is set to or derived as 0. The decoder 410 decodes num_brick_rows_minus2[i] from the bitstream when uniform_brick_spacing_flag==0 and the value of RowHeight[i] exceeds 3 (S1192). Meanwhile, when uniform_brick_spacing_flag==0 and the value of RowHeight[i] does not exceed 3, num_brick_rows_minus2[i] is not decoded, and the value thereof is set to or derived as 0. The decoder 410 decodes brick_row_height_minus1[i][j] from the bitstream (S1194).

As described above, the brick partitioning method proposed in the present disclosure is configured to signal and decode brick_height_minus1[i] and num_brick_rows_minus2[i] only when the value of RowHeight[i] exceeds 3. On the other hand, in the conventional brick partitioning methods, brick_height_minus1[i] and num_brick_rows_minus2[i] are signaled and decoded for both the cases when the value of RowHeight[i] exceeds 3 and when the value of RowHeight[i] does not exceed 3 (in other words, independently of whether the value of RowHeight[i] exceeds 3). Accordingly, the brick partitioning method of the present disclosure may improve bit efficiency compared to the conventional brick partitioning methods.

Embodiment 2

Embodiment 2 relates to a method for partitioning a picture into slices (method for obtaining slice partition information) and a method for obtaining an enable flag.

Table 5 shows a syntax structure related to embodiment 2.

TABLE 5

| | Descriptor |
| --- | --- |
| pic_parameter_set_rbsp( ) { | |
|   single_brick_per_slice_flag | u(1) |
|   if( !single_brick_per_slice_flag) | |
|     rect_slice_flag | u(1) |
|   if(rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | |
|   loop_filter_across_bricks_enabled_flag | u(1) |
|   if (loop_filter_across_bricks_enabled_flag | |
|   & !single_brick_per_slice_flag & rect_slice_flag ) | |
|     loop_filter_across_slices_enabled_flag | u(1) |
|   } | |
|   if( rect_slice_flag ) { | |
|     signalled_slice_id_flag | u(1) |
|     if( signalled_slice_id_flag) { | |

TABLE 5-continued

| | Descriptor |
| --- | --- |
|     signalled_slice_id_length_minus1 | ue(v) |
|     for( i = 0; i <= num_slices_in_pic_minus1; i++ ) | |
|       slice_id[ i ] | u(v) |
|     } | |
|   } | |
| } | |

Embodiment 2-1

Figure 12:
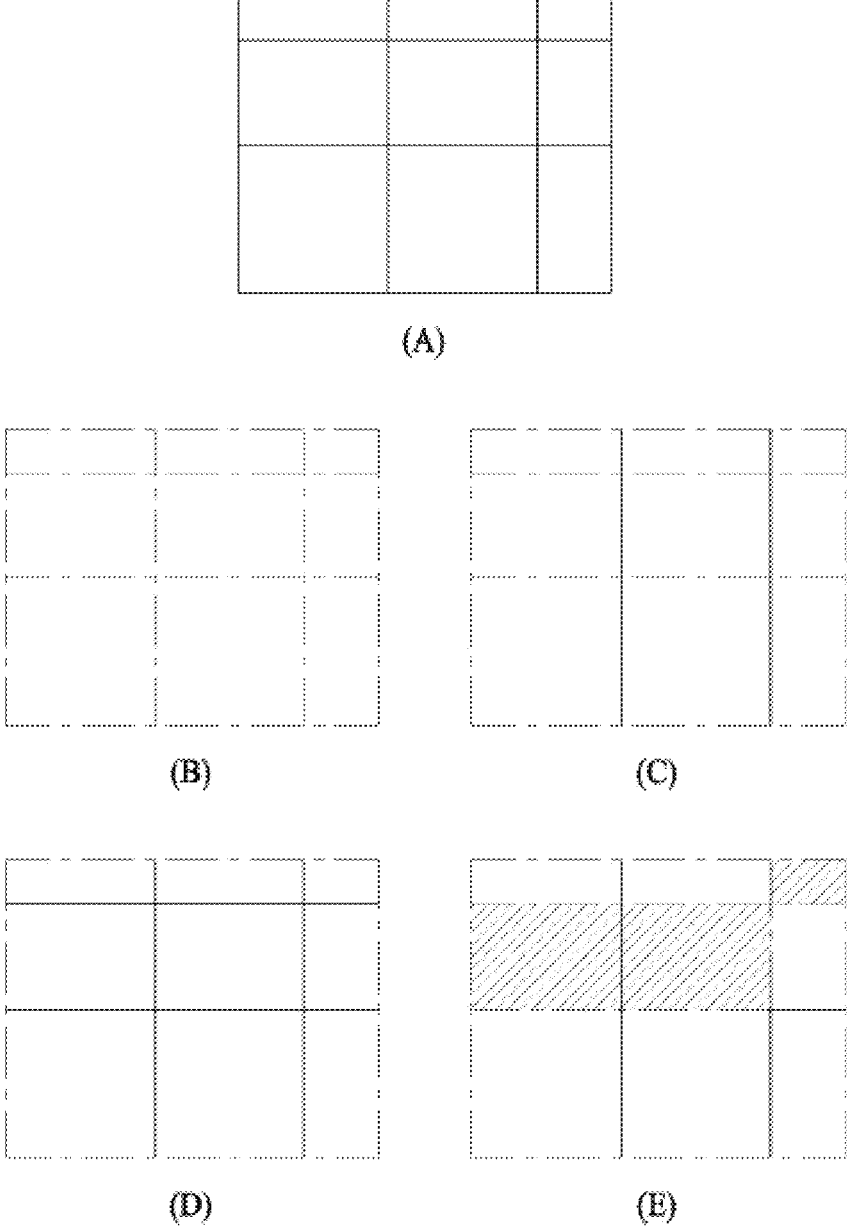
FIG. 12 illustrates a partition relationship between a tile/brick and a slice.
Figure 13:
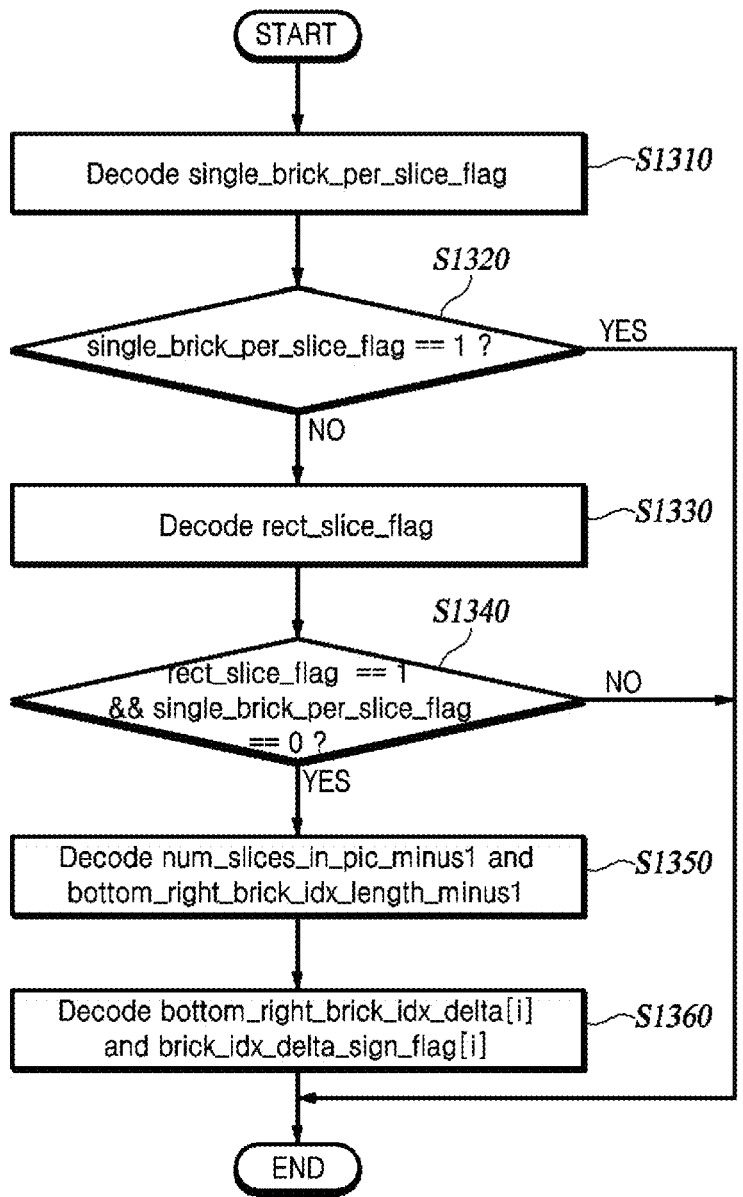
FIG. 13 is a flow diagram illustrating one example of a method for partitioning a picture into slices.

Embodiment 2-1 relates to a method for partitioning a picture into slices. Slice partitioning may be implemented in the form of including one or more tiles/bricks. FIG. 12 shows a partition relationship between tiles/bricks and slices, and FIG. 13 shows a method for partitioning a picture into slices.

FIG. 12(A) shows a total of 9 tiles/bricks (3×3) split from a picture, and FIGS. 12(B) to (D) show partition relationships among tiles/bricks (solid line) and slices (dash-dotted lines) based on the tile/brick partitioning of FIG. 12(A). As shown in FIG. 12(B), one tile/brick may comprise one slice (1:1 partition relationship), and a plurality of tiles/bricks may comprise one rectangular slice as shown in FIG. 12(C) (n:1 partition relationship, where n is a natural number greater than or equal to 2). Also, as shown in FIG. 12(D), the entire tiles/bricks may constitute one slice (all:1 partition relationship), and as shown in FIG. 12(E), a plurality of tiles/bricks may form one raster scan slice. In FIG. 12(E), tiles/bricks filled with oblique lines in the upper right direction constitute one raster scan slice. Also, among the tiles/bricks not filled with the oblique line pattern, two tiles/bricks in the upper part of the picture constitute another raster scan slice, and another three tiles/bricks in the lower part and on the right side of the picture constitute yet another raster scan slice.

The video encoding apparatus determines whether a slice includes one or more tiles/bricks and sets the determination result as a value of the single_brick_per_slice_flag syntax element. When single_brick_per_slice_flag==1, it indicates that a slice includes one tile/brick, and when single_brick_per_slice_flag==0, it indicates that a slice may include one or more tiles/brick. single_brick_per_slice_flag is coded and signaled to the video decoding apparatus.

When single_brick_per_slice_flag==1, a tile/brick and a slice have a 1:1 partition relationship; thus, the video encoding apparatus does not signal additional slice partition information.

The video encoding apparatus determines the mode of a slice and sets the determination result as a value of the rect_slice_flag syntax element. When rect_slice_flag==0, it indicates that the mode of the related slice is the raster scan slice mode; when rect_slice_flag==1, it indicates that the mode of the related slice is the rectangular slice mode. When single_brick_per_slice_flag==0, rect_slice_flag is encoded and signaled to the video decoding apparatus.

The video encoding apparatus determines the number of slices within a picture and sets the determination result as a value of the num_slices_in_pic_minus1 syntax element. num_slices_in_pic_minus1 is a syntax element indicating a value obtained by subtracting 1 from the number of slices within a picture. num_slices_in_pic_minus1 is encoded and signaled to the video decoding apparatus.

The video encoding apparatus determines a tile/brick (lower-right tile/brick) located inside the lower right part of each slice and sets the absolute value and sign of an index value difference between the lower right tiles/bricks as the values of bottom_right_brick_idx_delta[i] syntax element and brick_idx_delta_sign_flag[i] syntax element.

For the second and subsequent (i>1) slices in the picture, bottom_right_brick_idx_delta[i] represents the absolute value of a difference between the index of the lower right tile/brick in the previous slice and the index of the lower right tile/brick in the subsequent slice However, bottom_right_brick_idx_delta[i] indicates the index of the lower right tile/brick in the first slice when it comes to the first (i==0) slice in the picture. When brick_idx_delta_sign_flag[i]==1, it indicates that the sign of bottom_right_brick_idx_delta[i] is positive; when brick_idx_delta_sign_flag[i]==0, it indicates that the sign of bottom_right_brick_idx_delta[i] is negative. bottom_right_brick_idx_delta[i] and brick_idx_delta_sign_flag[i] are encoded and signaled to the video decoding apparatus.

Before bottom_right_brick_idx_delta[i] and brick_idx_delta_sign_flag[i] are signaled, bottom_right_brick_idx_length_minus1 syntax element is coded and signaled. bottom_right_brick_idx_length_minus1 indicates the number of bits used to represent bottom_right_brick_idx_delta[i].

The decoder 410 decodes single_brick_per_slice_flag from the bitstream (S1310). When single_brick_per_slice_flag does not exist in the bitstream, the value of single_brick_per_slice_flag is set to or derived as "1."

The decoder 410 determines whether to decode (obtain) additional slice partition information based on the value of single_brick_per_slice_flag (S1320). When single_brick_per_slice_flag==1, additional slice partition information is not decoded, and slice partition information is derived from the tile/brick partition information. On the contrary, when single_brick_per_slice_flag==0, the decoder 410 decodes rect_slice_flag from the bitstream (S1330). When rect_slice_flag does not exist in the bitstream, the value of rect_slice_flag is set to or derived as "1."

When the mode of a slice is a rectangular slice mode (rect_slice_flag==1) and the slice includes one or more tiles/bricks (single_brick_per_slice_flag==0) (S1340), the decoder 410 decodes num_slices_in_pic_minus1 and bottom_right_brick_idx_length_minus1 from a bitstream (S1350). When num_slices_in_pic_minus1 does not exist in the bitstream and single_brick_per_slice_flag==1, num_slices_in_pic_minus1 is not decoded and is set to or derived as a value obtained by subtracting 1 from the number of tiles/bricks in the picture.

When the mode of a slice is the rectangular slice mode (rect_slice_flag==1) and the slice includes one or more tiles/bricks (single_brick_per_slice_flag==0) (S1340), the decoder 410 decodes bottom_right_brick_idx_delta[i] and brick_idx_delta_sign_flag[i] from the bitstream (S1360). Since bottom_right_brick_idx_delta[i] and brick_idx_delta_ sign_flag[i] are not signaled (decoded) when single_brick_per_slice_flag==1, bottom_right_brick_idx_delta[i] is set to or derived as 1 (bottom_right_brick_idx_delta[i]==1).

Table 6 shows the slice partitioning method of embodiment 2-1 applied to the partition relationship between tiles and slices of FIG. 12.

TABLE 6

| | FIG. 12(B) | FIG. 12(C) | FIG. 12(D) | FIG. 12(E) |
|---|---|---|---|---|
| single_brick_per_slice_flag | 1 | 0 | 0 | 0 |
| rect_slice_flag | — | 1 | 0 | 0 |
| num_slices_in_pic_minus1 | — | 2 | — | — |
| bottom_right_brick_idx_length_minus1 | — | | — | — |
| bottom_right_brick_idx_delta | — | 2/3/3 | — | — |
| brick_idx_delta_sign_flag | — | +/+/+ | — | — |

In the case of FIG. 12(B), since the partition relationships between tiles/bricks and slices are the same (1:1 relationship), single_brick_per_slice_flag is signaled by being set to "1"; other slice partition information is derived from the tile/brick partition information without signaling.

In the case of FIG. 12(C), since the partition relationships between tiles/bricks and slices are not the same, single_brick_per_slice_flag is signaled by being set to "0"; since the mode of the slices is the rectangular slice mode, rect_slice_flag is signaled by being set to 1. Also, since the number of slices in the picture is 3, num_slices_in_pic_minus1 is signaled by being set to 2; bottom_right_brick_idx_delta[i] is set and signaled such that bottom_right_brick_idx_delta[0]==2, bottom_right_brick_idx_delta[1]==3, and bottom_right_brick[2]==3. Also, brick_idx_delta_sign_flag[i] is set and signaled such that brick_idx_delta_sign_flag[0]==1(+), brick_idx_delta_sign_flag[1]==1, and brick_idx_delta_sign_flag[2]==1.

In the case of FIGS. 12(D) and (E), since the partition relationships between tiles/bricks and slices are not the same, single_brick_per_slice_flag is signaled by being set to "0"; since the mode of the slices is the raster scan slice mode, rect_slice_flag is signaled by being set to 0. The remaining slice partition information is not signaled.

In a different embodiment, the slice mode of FIG. 12(D) may be set to the rectangular slice mode (rect_slice_flag==1), and the number of slices in a picture may be set to one (num_slices_in_pic_minus1==0). In this case, Table 7 shows an example of signaled slice partition information.

TABLE 7

| | FIG. 12(D) |
|---|---|
| single_brick_per_slice_flag | 0 |
| rect_slice_flag | 1 |
| num_slices_in_pic_minus1 | 0 |
| bottom_right_brick_idx_length_minus1 | 0 |
| bottom_right_brick_idx_delta | — |
| brick_idx_delta_sign_flag | — |

Embodiment 2-2

Embodiment 2-2 relates to a method for obtaining an enable flag (loop_filter_across_slices_enabled_flag) indicating whether in-loop filtering is applied to a boundary between slices.

Signaling of loop_filter_across_slices_enabled_flag may be determined based on a preset condition. This is because, depending on the partition relationship between a tile/brick and a slice, the boundary of the tile/brick and the boundary of the slice may partially or entirely overlap (or may be the same). For example, in the case of FIG. 12(B), the boundary of the tile/brick and the boundary of the slice are entirely the same; in the case of FIG. 12(C), the boundary of the tile/brick and the boundary of the slice are partially the same; in the case of FIG. 12(D), the boundary of the slice becomes the boundary of the picture, and in the case of FIG. 12(E), the boundary of the tile/brick and the boundary of the slice may be partially the same.

Various examples of embodiment 2-2 are shown in FIGS. 14 to 17.

The video encoding apparatus encodes slice partition information and signals the encoded information to the video decoding apparatus. The decoder 410 decodes slice partition information from a bitstream (S1410, S1510, S1610, S1710), and partitions a picture into one or more slices based on the slice partition information.

Depending on preset conditions, the video encoding apparatus determines whether to signal loop_filter_across_slices_enabled_flag. In other words, loop_filter_across_slices_enabled_flag is encoded when the preset condition is satisfied and signaled to the video decoding apparatus. The decoder 410 determines whether the preset condition is satisfied (S1420, S1520, S1620, S1720) and decodes loop_filter_across_slices_enabled_flag from the bitstream based on the determination result (S1430, S1530, S1630, S1730).

The preset conditions may include one or more conditions of whether the number of slices in a picture is plural (whether the picture is partitioned into a plurality of slices) and whether the slice mode is the rectangular slice mode.

Figure 14:
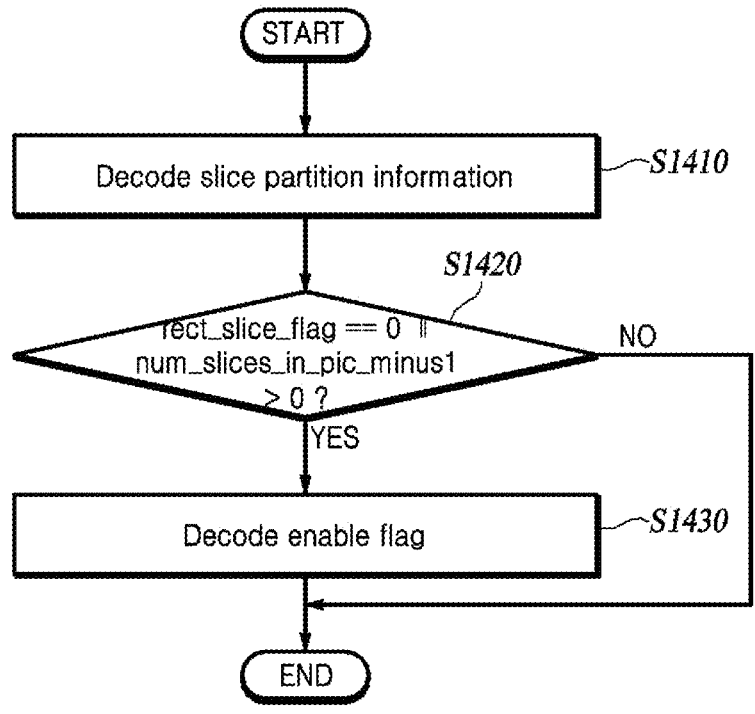
FIGS. 14 to 17 are flow diagrams illustrating various examples of a method for obtaining information on whether to apply filtering of slice boundaries.

For example, as shown in FIG. 14, the preset conditions may include both the conditions of whether the number of slices in a picture is plural (num_slices_in_pic_minus1) and whether the mode of the slice is the rectangular slice mode (rect_slice_flag). In this case, when the number of slices in the picture is plural or the slice mode is not the rectangular slice mode (num_slices_in_pic_minus1>0||rect_slice_flag==0), loop_filter_across_slices_enabled_flag is signaled and decoded.

In the cases of FIGS. 12 (B) and (C), since num_slices_in_pic_minus1>0, loop_filter_across_slices_enabled_flag is signaled and decoded, and in the cases of FIGS. 12 (D) and (E), since rect_slice_flag==0, loop_filter_across_slices_enabled_flag is signaled and decoded.

In a different embodiment, the preset conditions may include one or more conditions of whether the slice mode is the rectangular slice mode, whether one or more tiles/bricks are included in a slice, and whether in-loop filtering is applied to the boundary between tiles/bricks.

Figure 15:
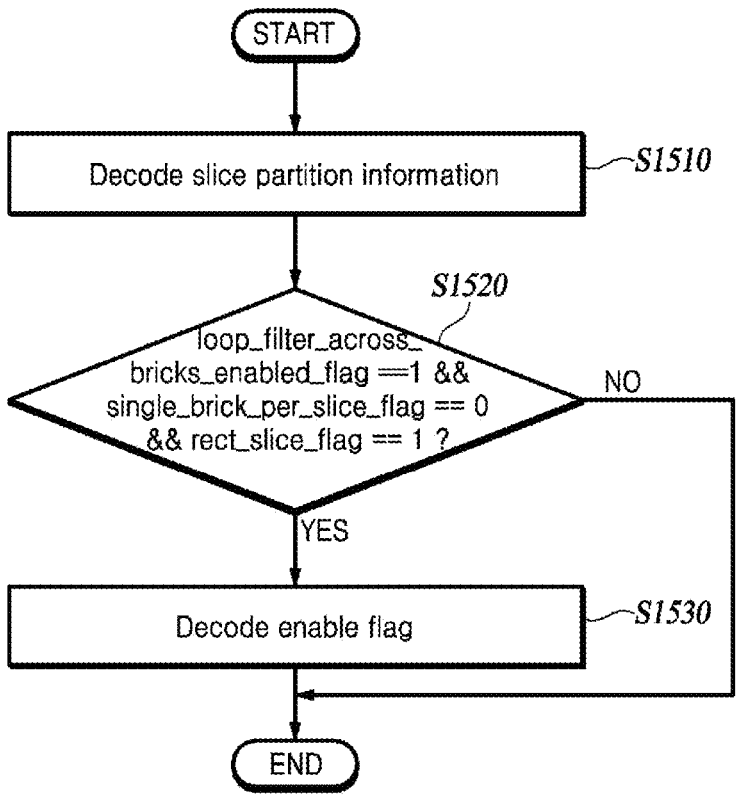

For example, as shown in FIG. 15, the preset conditions may include all of the conditions of whether the slice mode is the rectangular slice mode (rect_slice_flag), whether one or more tiles/bricks are included in a slice (single_brick_per_slice_flag), and whether in-loop filtering is applied to the boundary between the tiles/bricks (loop_filter_across_bricks_enabled_flag).

In this case, when the slice mode is the rectangular slice mode, the slice includes one or more tiles/bricks, and in-loop filtering is applied to the boundary between tiles/bricks (rect_slice_flag==1 && single_brick_per_slice_flag==0 && loop_filter_across_bricks_enabled_flag==1), loop_filter_across_slices_enabled_flag is signaled and decoded. Table 5 shows the syntax structure for the preset conditions shown in FIG. 15.

In the case of FIG. 12(B), since single_brick_per_slice_flag==1, loop_filter_across_slices_enabled_flag is not signaled and decoded. Since the partition relationship between a tile/brick and a slice is 1:1 (namely, all of the boundaries of the tiles/bricks coincide with those of the slices), it is not necessary to separately signal loop_filter_across_slices_enabled_flag for the slice boundary.

In the case of FIG. 12(C), since rect_slice_flag==1, single_brick_per_slice_flag==0, and loop_filter_across_bricks_enabled_flag==1, loop_filter_across_slices_enabled_flag is signaled. In the case of FIGS. 12 (D) and (E), since rect_slice_flag==0, loop_filter_across_slices_enabled_flag is not signaled. Here, in the case of all:1 partition relationship as shown in FIG. 12(D), the slice boundary coincides with the picture boundary, and therefore it is not necessary to separately signal loop_filter_across_slices_enabled_flag for the slice boundary.

Figure 16:
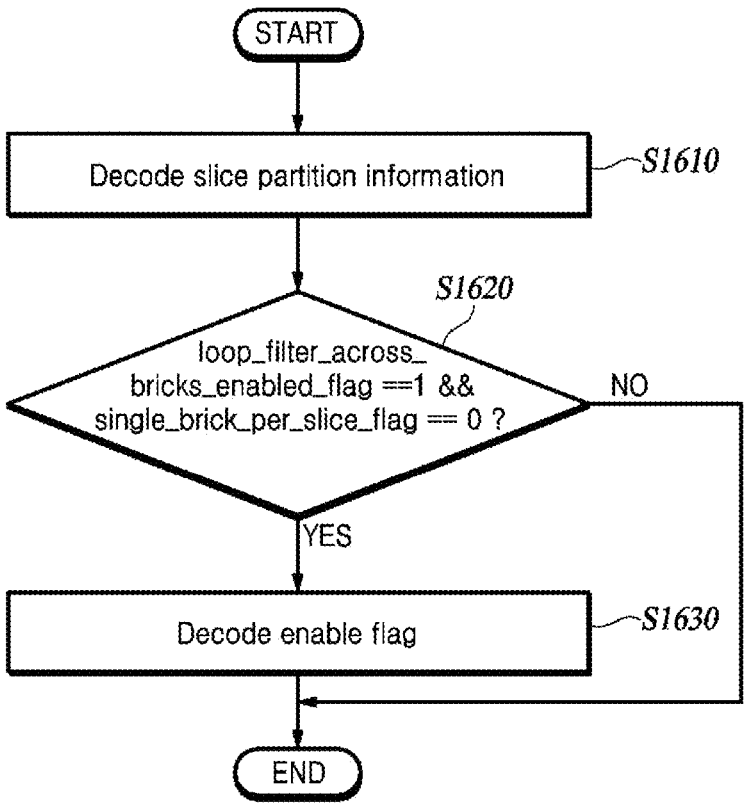

In a different embodiment, as shown in FIG. 16, the preset conditions may include whether one or more tiles/bricks are included in a slice (single_brick_per_slice_flag) and whether in-loop filtering is applied to the boundary between tiles/bricks (loop_filter_across_bricks_enabled_flag).

In this case, when one or more tiles/bricks are included in the slice, and in-loop filtering is applied to the boundary between tiles/bricks (single_brick_per_slice_flag==0 && loop_filter_across_bricks_enabled_flag==1), loop_filter_across_slices_enabled_flag is signaled and decoded.

Table 8 shows the syntax structure for the preset conditions shown in FIG. 16.

TABLE 8

|  | Descriptor |
|---|---|
| pic_parameter_set_rbsp( ) {<br>    loop_filter_across_bricks_enabled_flag<br>    if loop_filter_across_bricks_enabled_flag<br>& !single_brick_per_slice_flag)<br>        loop_filter_across_slices_enabled_flag<br>} | u(1)<br><br><br>u(1) |

In the case of FIG. 12 (B), since single_brick_per_slice_flag==1, loop_filter_across_slices_enabled_flag is not signaled. In the case of FIGS. 12 (C) to (E), since single_brick_per_slice_flag==0 and loop_filter_across_bricks_enabled_flag==1, loop_filter_across_slices_enabled_flag is signaled.

Figure 17:
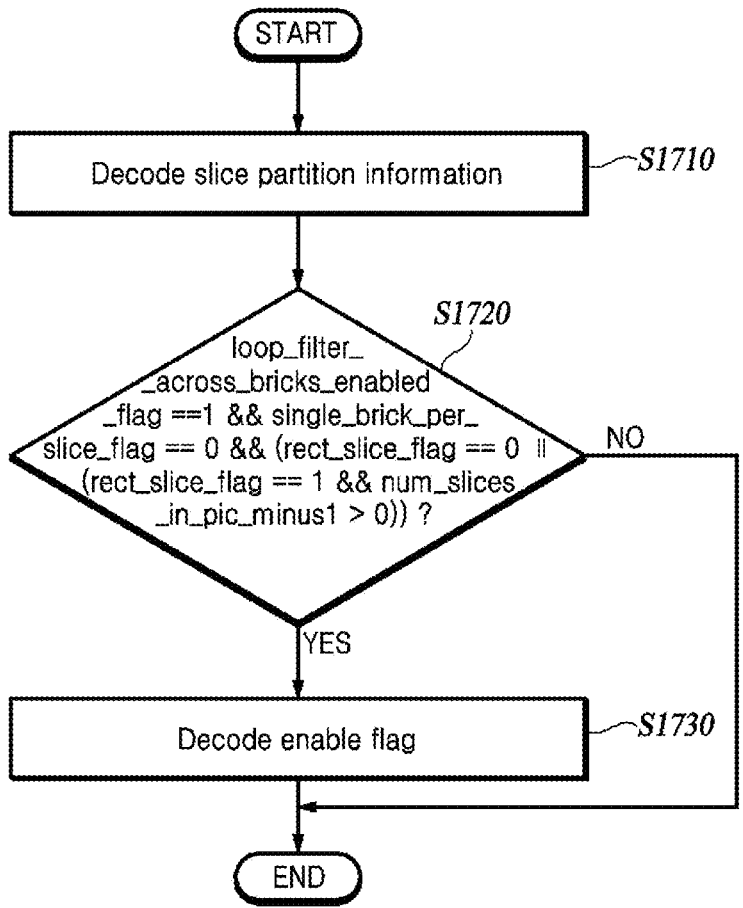

In a different embodiment, as shown in FIG. 17, the preset conditions may include whether the number of slices in a picture is plural (num_slices_in_pic_minus1), whether the slice mode is the rectangular slice mode (rect_slice_flag), whether one or more tiles/bricks are included in the slice (single_brick_per_slice_flag), and whether in-loop filtering is applied to the boundary between tiles/bricks (loop_filter_across_bricks_enabled_flag).

In this case, when in-loop filtering is applied to the boundary between tiles/bricks, one or more tiles/bricks are included in a slice, and the slice mode is not the rectangular slice mode (loop_filter_across_bricks_enabled_flag==1 && single_brick_per_slice_flag==0 && rect_slice_flag==0), loop_filter_across_slices_enabled_flag is signaled and decoded.

Alternatively, when in-loop filtering is applied to the boundary between tiles/bricks, one or more tiles/bricks are included in a slice, the slice mode is a rectangular slice mode, and the number of slices in a picture is plural (loop_filter_across_bricks_enabled_flag==1 && single_brick_per_slice_flag==0 && rect_slice_flag==1 && num_slices_in_pic_minus1>0), loop_filter_across_slices_enabled_flag is signaled and decoded.

Table 9 shows the syntax structure for the preset conditions shown in FIG. 17.

TABLE 9

| | Descriptor |
|---|---|
| pic_parameter_set_rbsp( ) { | |
|     loop_filter_across_bricks_enabled_flag | u(1) |
|     if( loop_filter_across_bricks_enabled_flag & !single_brick_per_slice_flag | |
| & ( !rect_slice_flag \| \| | |
|        ( rect_slice_flag & num_slices_in_pic_minus1) ) ) | |
|        loop_filter_across_slices_enabled_flag | u(1) |
| } | |

If the slice setting shown in Table 7 is applied to the preset conditions of FIG. 17, whether the enable flag is signaled may be determined as follows. In the case of FIG. 12(B), since single_brick_per_slice_flag==1, loop_filter_across_slices_enabled_flag is not signaled. In the cases of FIGS. 12(C) and (E), since loop_filter_across_bricks_enabled_flag==1, single_brick_per_slice_flag==0, rect_slice_flag==1, and num_slices_in_pic_minus1>0, loop_filter_across_slices_enabled_flag is signaled. In the case of FIG. 12(D), since num_slices_in_pic_minus1==0, loop_filter_across_slices_enabled_flag is not signaled.

Embodiment 3

Figure 18:
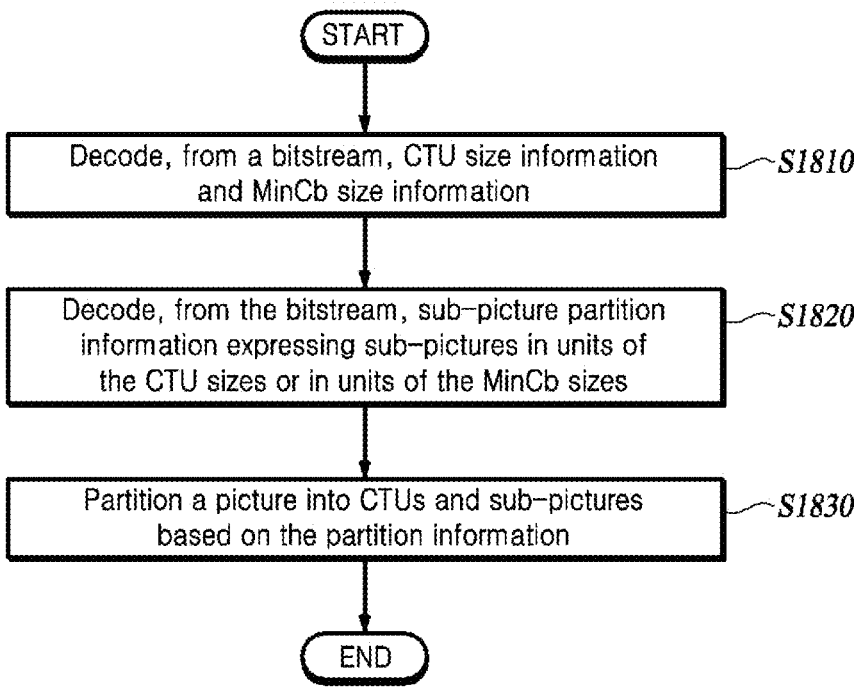
FIG. 18 is a flow diagram illustrating one example of a method for partitioning a picture into sub-pictures.

Embodiment 3 relates to a method for partitioning a picture into sub-pictures (method for obtaining sub-picture partition information). FIG. 18 shows one example of embodiment 3.

After partitioning a picture into a plurality of CTUs having a predetermined size, the video encoding apparatus encodes the size information (CTU size information) of the CTU and signals the encoded information to the video decoding apparatus. Also, after partitioning a CTU into CUs based on a tree structure, the video encoding apparatus encodes the minimum size information (MinCb size information) of the CU and signals the encoded information to the video decoding apparatus. The MinCb size information may be defined and signaled at one or more positions among the SPS level, the PPS level, and the slice header level of a bitstream.

The video encoding apparatus partitions a picture into a plurality of sub-pictures. A picture may be partitioned into sub-pictures based on the CTU size derived from the CTU size information or based on the MinCb size derived from the MinCb size information.

Accordingly, the sub-picture partition information may express the sub-pictures within a picture in units of the CTU sizes or in units of the MinCb sizes. The sub-picture partition information may include sub-picture position information indicating the position of each sub-picture and sub-picture size information indicating the size of each sub-picture. The sub-picture position information may express the position of a sub-picture within a picture in units of the CTU sizes or in units of the MinCb sizes. The sub-picture size information may also express the size of a sub-picture in units of the CTU sizes or in units of the MinCb sizes.

The decoder 410 decodes the CTU size information and the MinCb size information from the bitstream (S1810). Also, the decoder 410 decodes the sub-picture partition information from the bitstream (S1820).

The decoder 410 partitions a picture into CTUs based on the CTU size information and partitions the picture into sub-pictures based on the sub-picture partition information (S1830).

Conventional sub-picture partitioning methods express a sub-picture in units of four samples. In other words, the conventional sub-picture partitioning methods use a multiple of 4 as a unit of sub-picture partition. However, as described above, a picture may be partitioned into a plurality of CTUs, partitioned into tiles/bricks containing one or more CTUs, partitioned into slices containing one or more tiles/bricks, and partitioned into sub-pictures containing one or more slices. Accordingly, it may be most efficient to express tiles/bricks, slices, and sub-pictures in units of the CTU sizes (in units of multiples of a CTU). Therefore, when a sub-picture is expressed in units of the CTU sizes according to embodiment 3, efficient sub-picture partitioning may be implemented.

Based on the embodiment, the sub-picture partition information may directly or indirectly express a sub-picture in the CTU size or the MinCb size units. Here, the indirect expression method connects between a CTU and a sub-picture through a different sub-unit. The different sub-unit may be a grid, and the grid may be expressed in units of the CTU sizes, the sub-pictures are expressed in units of the grid sizes, and as a result, the sub-pictures may be expressed in units of the CTU sizes.

Figure 19:
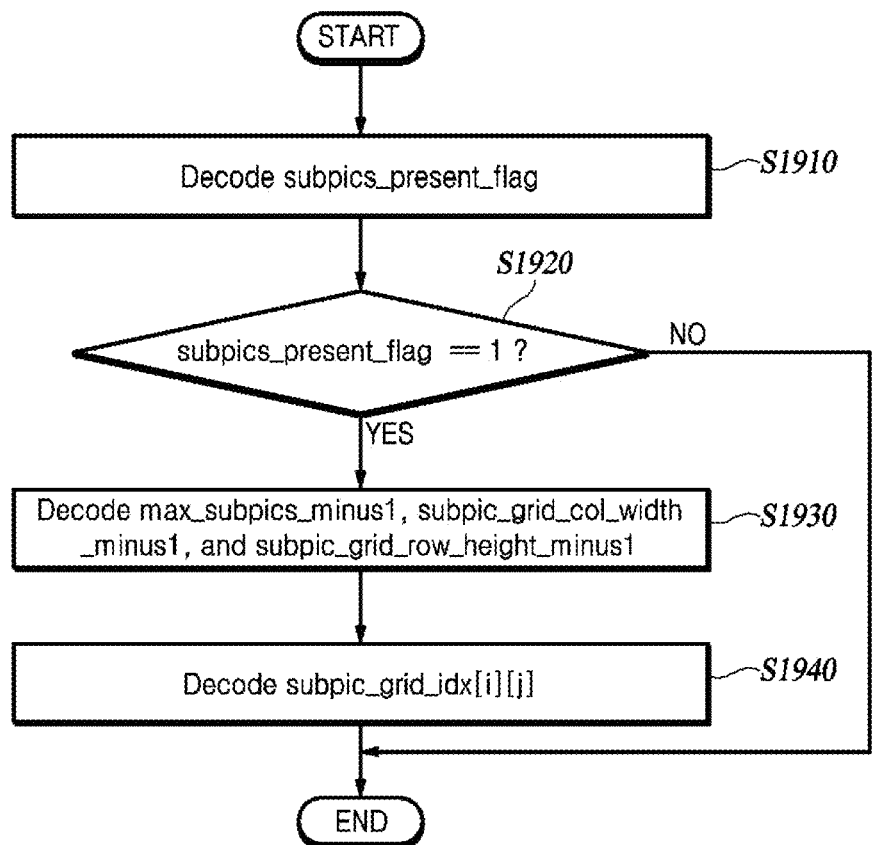
FIG. 19 is a flow diagram illustrating a specific method for partitioning a picture into sub-pictures.

FIG. 19 shows an example of the indirect expression method, and Table 10 shows a syntax structure of the indirect expression method.

TABLE 10

| | Descriptor |
|---|---|
| seq_parameter_set_rbsp( ) { | |
|   subpics_present_flag | u(1) |
|   if( subpics _present_flag ) { | |
|     max_subpics_minus' | u(8) |
|     subpic_grid_col_width_minus1 | u(v) |
|     subpic_grid_row_height_minus1 | u(v) |
|     for( i = 0;i < NumSubPicGridRows; i++ ) | |
|       for(j = 0; j < NumSubPicGridCols; j++ ) | |
|         subpic_grid_idx[ i ][ j ] | u(v) |
|     for i = 0; i <= NumSubPies; i++ ) { | |
|       subpic_treated_as_pic_flag[ i ] | u(1) |
|       loop_filter_across_subpic_enabled_flag[ i ] | u(1) |
|     } | |
|   } | |
| } | |

The video encoding apparatus determines whether sub-picture partitioning is performed (whether sub-picture parameters exist in a bitstream) and sets the determination result as a value of the subpics_present_flag syntax element. When subpics_present_flag==1, it indicates that sub-picture partitioning is performed, and when subpics_present_flag==0, it indicates that sub-picture partitioning is not performed.

When subpics_present_flag==1, the video encoding apparatus decodes max_subpics_minus1, which is a syntax element indicating the maximum number of sub-pictures, subpic_grid_col_width_minus1, which is a syntax element indicating the width of a grid column in the CTU size units or in the MinCb size units, and subpic_grid_row_height_minus1, which is a syntax element indicating the height of a grid row in the CTU size units or in the MinCb size units, and signals the encoded syntax elements to the video decoding apparatus.

max_subpics_minus1 represents a value obtained by subtracting 1 from the maximum number of sub-pictures, subpic_grid_col_width_minus1 represents a value obtained by subtracting 1 from the width of a grid column, and subpic_grid_row_height_minus1 represents a value obtained by subtracting 1 from the height of a grid row.

The video encoding apparatus encodes the sub-picture index (subpic_grid_idx[i][j]) and signals the encoded sub-picture index to the video decoding apparatus. The sub-picture index indicates the index of a sub-picture to which each grid belongs, and which grid belongs to which sub-picture may be determined by the sub-picture index.

The decoder 410 decodes subpics_present_flag from the bitstream (S1910) and determines the value of subpics_present_flag (S1920).

When subpics_present_flag==1, the decoder 410 decodes max_subpics_minus1, subpic_grid_col_width_minus1, and subpic_grid_row_height_minus1 from the bitstream (S1930).

Since grids have a fixed width and height, the number (i) of grid columns may be derived based on subpic_grid_col_width_minus1, and the number (j) of grid rows may be derived based on subpic_grid_row_height_minus1. As a result, a picture may be partitioned into grids based on subpic_grid_col_width_minus1 and subpic_grid_row_height_minus1.

The decoder 410 may decode the sub-picture index from the bitstream (S1940) and partition the picture into sub-pictures through a process of determining grids to which the same sub-picture index is assigned from among the grids as one sub-picture.

Although exemplary embodiments have been described for illustrative purposes, those skilled in the art will appreciate that various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding method comprising:
decoding, from a bitstream, information on sub-units partitioned from a picture; and
reconstructing the picture based on the information on the sub-units,
wherein the decoding of the information on the sub-units comprises:
decoding CTU size information indicating the size of coding tree units (CTUs) within the picture from the bitstream,
decoding sub-picture partition information for partitioning the picture to one or more sub-pictures each of which is comprised of at least one slice from the bitstream, wherein the sub-picture partition information is defined by the unit of the CTU size, decoding tile partition information related to partition of the picture into one or more tiles from the bitstream, wherein the tile partition information includes at least one of information on the number of the tiles and information on a size of the tiles,
decoding slice partition information related to partition of the picture into one or more slices from the bitstream, and
decoding, from the bitstream, an enable flag indicating whether filtering is performed at a boundary of the one or more slices, based on a slice mode of the one or more slices among a plurality of slice modes including a rectangular slice mode and a raster-scan slice mode.

2. The method of claim 1, wherein the slice partition information is defined on a basis of tiles determined by the tile partition information.

3. The method of claim 2, wherein the enable flag is decoded when the number of the one or more slices is plural and the slice mode is the rectangular slice mode, or when the slice mode is the raster-scan slice mode.

4. A video encoding method comprising:
partitioning a picture into sub-units to encode the picture; and
encoding information on the sub-units,
wherein the encoding of the information on the sub-units comprises:
encoding CTU size information indicating the size of coding tree units (CTUs) within the picture,
encoding sub-picture partition information for partitioning the picture to one or more sub-pictures each of which is comprised of at least one slice, wherein the sub-picture partition information is defined by the unit of the CTU size,
encoding tile partition information related to partition of the picture into one or more tiles, wherein the tile partition information includes at least one of information on the number of the tiles and information on a size of the tiles,
encoding slice partition information related to partition of the picture into one or more slices, and
encoding an enable flag indicating whether filtering is performed at a boundary of the one or more slices, based on a slice mode of the one or more slices among a plurality of slice modes including a rectangular slice mode and a raster-scan slice mode.

5. A method for transmitting a bitstream containing encoded video data, the method comprising:
generating the bitstream, by partitioning a picture into sub-units to encode the picture and encoding information on the sub-units; and
transmitting the bitstream to a video decoding apparatus,
wherein the encoding of the information on the sub-units comprises:
encoding CTU size information indicating the size of coding tree units (CTUs) within the picture,
encoding sub-picture partition information for partitioning the picture to one or more sub-pictures each of which is comprised of at least one slice, wherein the sub-picture partition information is defined by the unit of the CTU size,
encoding tile partition information related to partition of the picture into one or more tiles, wherein the tile partition information includes at least one of information on the number of the tiles and information on a size of the tiles, encoding slice partition information related to partition of the picture into one or more slices, and encoding an enable flag indicating whether filtering is performed at a boundary of the one or more slices, based on a slice mode of the one or more slices among a plurality of slice modes including a rectangular slice mode and a raster-scan slice mode.

\* \* \* \* \*